United States Patent
Arshavskiy

(10) Patent No.: US 12,354,791 B2
(45) Date of Patent: Jul. 8, 2025

(54) SATELLITE SYSTEM

(71) Applicant: ZENNO ASTRONAUTICS LIMITED, Auckland (NZ)

(72) Inventor: Maksim Arshavskiy, Auckland (NZ)

(73) Assignee: Zenno Astronautics Limited, Auckland (NZ)

( * ) Notice: Subject to any disclaimer, the term of this patent is extended or adjusted under 35 U.S.C. 154(b) by 335 days.

(21) Appl. No.: 17/418,580

(22) PCT Filed: Feb. 25, 2020

(86) PCT No.: PCT/IB2020/051579
§ 371 (c)(1),
(2) Date: Jun. 25, 2021

(87) PCT Pub. No.: WO2020/174378
PCT Pub. Date: Sep. 3, 2020

(65) Prior Publication Data
US 2022/0084729 A1 Mar. 17, 2022

(30) Foreign Application Priority Data
Feb. 25, 2019 (NZ) .................................. 751022

(51) Int. Cl.
*H01F 6/00* (2006.01)
*B64G 1/10* (2006.01)
(Continued)

(52) U.S. Cl.
CPC ............ *H01F 6/008* (2013.01); *B64G 1/10* (2013.01); *B64G 1/283* (2013.01); *B64G 1/32* (2013.01);
(Continued)

(58) Field of Classification Search
CPC . H01F 6/008; H01F 6/04; H01F 6/006; H01F 6/06; B64G 1/10; B64G 1/283;
(Continued)

(56) References Cited

U.S. PATENT DOCUMENTS 3,061,239 A  10/1962  Rusk
3,189,298 A  6/1965  Buckingham et al.
(Continued)

FOREIGN PATENT DOCUMENTS

CN  105667838 A  6/2016
EP  3339188 A1  6/2018
(Continued)

OTHER PUBLICATIONS

CubeSat 101, Basic concepts and processes for first-time cubesat developers, NASA cubesat launch initiative, For public release-revision dated Oct. 2017 (Year: 2017).*
(Continued)

*Primary Examiner* — Thienvu V Tran
*Assistant Examiner* — Sreeya Sreevatsa
(74) *Attorney, Agent, or Firm* — Loginov & Associates, PLLC; William A. Loginov

(57) ABSTRACT

A novel cooling system for a superconducting electromagnet (740) that is suitable for use in satellite (700), or at least one or more components of the electromagnet (740) is disclosed. A satellite (700) and electromagnetic control system (705) for position control of such a satellite (700) are also disclosed. The superconducting magnet control system (705) comprises at least one superconducting electromagnet (740) with at least one cooling element and at least one cryocooler (735). The cryocooler (735) is thermally coupled with the cooling element thereby enabling cooling of the supercon-
(Continued)

ducting electromagnet (740) or at least one or more components thereof through the cooling element solely by conduction cooling.

23 Claims, 11 Drawing Sheets

(51) Int. Cl.
  *B64G 1/28* (2006.01)
  *B64G 1/32* (2006.01)
  *B64G 1/40* (2006.01)
  *B64G 1/42* (2006.01)
  *B64G 1/44* (2006.01)
  *H01F 6/04* (2006.01)

(52) U.S. Cl.
  CPC .......... *B64G 1/417* (2023.08); *B64G 1/425* (2013.01); *B64G 1/443* (2013.01); *H01F 6/04* (2013.01)

(58) Field of Classification Search
  CPC .......... B64G 1/32; B64G 1/425; B64G 1/443; B64G 1/409; B64G 1/244; B33Y 80/00
  USPC .......................................... 361/141
  See application file for complete search history.

(56) References Cited

U.S. PATENT DOCUMENTS

| | | | |
|---|---|---|---|
| 3,190,581 | A | 6/1965 | Wilson, Jr. |
| 3,834,653 | A | 9/1974 | Perkel |
| 4,114,841 | A | 9/1978 | Muhlfelder et al. |
| 5,737,927 | A * | 4/1998 | Takahashi ................ H01F 6/04 62/51.1 |
| 6,107,905 | A * | 8/2000 | Itoh ...................... F25D 19/006 505/892 |
| 6,231,011 | B1 * | 5/2001 | Chu ....................... B64G 1/283 244/165 |
| 2008/0111655 | A1 | 5/2008 | Wozniak et al. |
| 2012/0036870 | A1 | 2/2012 | Kwon et al. |
| 2019/0006072 | A1 * | 1/2019 | Hull ........................ H01F 6/00 |

FOREIGN PATENT DOCUMENTS

| | | | |
|---|---|---|---|
| FR | 2809083 | A1 | 11/2001 |
| GB | 1132392 | A | 10/1968 |
| JP | H02303999 | A | 12/1990 |
| JP | H3229975 | A | 10/1991 |
| JP | 2011058398 | A | 3/2011 |

OTHER PUBLICATIONS

Y. Kim, T. Ki, H. Kim, S. Jeong, J. Kim and J. Jung, "High Temperature Superconducting Motor Cooled by On-Board Cryocooler," in IEEE Transactions on Applied Superconductivity, vol. 21, No. 3, pp. 2217-2220, Jun. 2011, doi: 10.1109/TASC.2010.2094597 ( Year: 2011).*

Y. Kim, T. Ki, H. Kim, S. Jeong, J. Kim and J. Jung, "High Temperature Superconducting Motor Cooled by On-Board Cryocooler," in IEEE Transactions on Applied Superconductivity, vol. 21, No. 3, pp. 2217-2220, Jun. 2011 (Year: 2011).*

Daniel W. Kwon, Propellantless formation flight applications using electromagnetic satellite formations, Acta Astronautica, vol. 67, Issues 9-10, 2010, pp. 1189-1201, ISSN 0094-5765 (Year: 2010).*

International Search Report and Written Opinion of International Searching Authority for International Application No. PCT/IB2020/051579.

C. M. Rey, W. C. Hoffman, Jr; F. R. Chang-Diaz; A. V. Ilin; A. J. Petro; D. S. Winter; H. Mukai; S. W. Schwenterly, Design and fabrication of an HTS magnet for VASIMR experiment, Mar. 2002, IEEE Transactions on Applied Superconductivity, vol. 12, No. 1, pp. 993-996.

L' Kopera; T Melišek, P Kováč; J Pitel, The design and performance of a Bi-2223/Ag magnet cooled by a single-stage cryocooler, Jun. 3, 2005, Superconductor Science and Technology, 18, pp. 977-984, doi: 10.1088/0953-2048/18/7/009.

Daniel W. Kwon, Cryogenic heat pipe for cooling high temperature superconductors with application to electromagnetic formation flight satellites, Oct. 18, 2010, Massachusetts Institute of Technology Libraries.

Gwendolyn Vines Gettliffe, High-temperature superconductors as electromagnetic deployment and support structures in spacecraft, Feb. 2013, Department of Aeronautics and Astronautics at the Massachusetts Institute of Technology.

Laurens Even, Design and characterization of a LTS flux pump system for possible satellite application, Jul. 8, 2016, University of Groningen.

Valentine Pulatov, Magnetic propulsion systems, Apr. 3, 2001, Progress in Aerospace Sciences 37 (2001), pp. 245-261.

CubeSat design specification rev. 13, The CubeSat Program, Cal Poly SLO.

Lin Fu; Koichi Matsuda; Mehdi Baghdadi; Tim Coombs, Linear flux pump device applied to high temperature superconducting (HTS) magnets, Jun. 2015, IEEE Transactions on Applied Superconductivity, vol. 25, No. 3.

Third Party Observation for International Application No. PCT/IB2020/051579.

International Preliminary Report on Patentability for International Application No. PCT/IB2020/051579.

Additional Comments of Third Party Observation for International Application No. PCT/IB2020/051579.

Walt, Martin, Introduction to Geomagnetically Trapped Radiation, Cambridge University Press, 1994, pp. 29-33.

Daniel W. Kwon, "Propellantless formation flight applications usig electromagnetic satellite formations", Acta Astronautica, 67, 1189-1201, 2010.

* cited by examiner

SATELLITE SYSTEM

The present invention relates to a satellite. More particularly, but not exclusively, it relates to a satellite interacting with a body with a magnetic field and electromagnetic control system for such a satellite.

BACKGROUND TO THE INVENTION

Superconducting electromagnets such as a high temperature superconducting (HTS) electromagnets are made from coils of superconducting wires. Such electromagnets may be desirable for use in position control of the satellites because in a superconducting state the wires of such electromagnets have zero electrical resistance and therefore can conduct much larger electric currents than ordinary wires, creating an intense magnetic field and can be cheaper to operate in terms of energy consumption. However, such electromagnets need to be cooled below their critical temperature, which is a temperature at which the HTS material changes from the normal resistive state and becomes a superconductor. Solutions to effectively and/or efficiently cooling the superconducting electromagnets to enable them to be more widely and effectively used in the satellite environment have not been sufficiently addressed in the past.

One common method of cooling a superconductive electromagnet involves the use of liquid helium as a coolant to cool the superconductive windings of the electromagnet. Typically, both the electromagnet and the coolant are contained inside a thermally insulated container. To keep the helium from boiling away, the container is usually constructed with an outer jacket containing liquid nitrogen. However, such a cooling method is also not desirable for cooling the electromagnets that are configured to be used in satellites due to extreme conditions in the outer space. The use of such outer jacket containing liquid nitrogen can add significant volume, mass and complexity to the satellite which is not desirable.

Therefore, aspects of effectively cooling the superconducting electromagnets and also maintaining a thermal mass at cryogenic temperature (below 80 Kelvin) have also not been sufficiently addressed in the past, when it comes to the superconducting electromagnets that are configured to be used in satellites.

Design of a satellite chassis that reduces or at least contributes towards reducing bulkiness and/or mass of the satellite is another aspect that has not been addressed sufficiently in the past.

One or more of the above-mentioned limitations and disadvantages may also apply to other spacecraft(s) using the magnetic field for position control.

OBJECT OF THE INVENTION

It is an object of the present invention to provide a satellite which overcomes or at least partially ameliorates some of the abovementioned limitations or disadvantages, or which at least provides the public with a useful choice.

Alternatively, and/or additionally, it is an object of the present invention to provide a spacecraft which overcomes or at least partially ameliorates some of the abovementioned limitations or disadvantages, or which at least provides the public with a useful choice.

Alternatively, and/or additionally it is an object of the present invention to provide one or more components or parts of a satellite or other spacecraft such as but not limited to an electromagnetic control system which overcomes or at least partially ameliorates some of the abovementioned limitations or disadvantages, or which at least provides the public with a useful choice.

STATEMENTS OF INVENTION

In a first aspect, the present invention resides in a satellite comprising:
a chassis; and
a superconducting magnet control system mounted to or within at least a portion of said chassis for position control of said satellite,
wherein, said superconducting magnet control system comprises:
at least one superconducting electromagnet comprising or mounted to at least one cooling element; and
at least one cryocooler; and
wherein, said at least one cryocooler is thermally coupled to said at least one cooling element to cool said at least one superconducting electromagnet or at least one or more components thereof through said at least one cooling element by conduction cooling alone.

In a second aspect, the present invention resides in a satellite comprising:
a chassis; and
a superconducting magnet control system mounted to or within at least a portion of the chassis for position control of said satellite, said superconducting magnet control system comprising:
at least one superconducting electromagnet;
at least one power source;
at least one control device;
at least one cryocooler; and
at least one electromagnetic flux injection device;
wherein, said at least one electromagnetic flux injection device is operatively coupled to said at least one control device and is configured to derive energy from said at least one power source to energise said at least one superconducting electromagnet,
wherein, said at least one cryocooler is operatively coupled to said at least one control device and to said at least one power source, wherein based on a control signal from the control device said at least one cryocooler is configured to derive energy from said at least one power source to cool said at least one superconducting electromagnet or at least one or more components thereof by conduction cooling alone, and
wherein, said at least one superconducting electromagnet comprises or is mounted to at least one cooling element and said at least one cryocooler is thermally coupled to at least one cooling element to cool said at least one cooling element, thereby also cooling said at least one superconducting electromagnet or at least one or more components thereof by conduction cooling alone.

In a third aspect, the present invention resides in a superconducting electromagnet of a satellite or a spacecraft, said superconducting electromagnet comprising at least one coil;
wherein:
said superconducting electromagnet further comprises or is mounted to a top cooling element and a bottom cooling element with said at least one coil being sandwiched between said top cooling element and said bottom cooling element,
said at least one coil is in thermal contact with said top cooling element and said bottom cooling element, and wherein said top cooling element and said bottom cooling element are configured to be thermally coupled to at least one cryocooler to cool said at least one coil through said top and bottom cooling elements by conduction cooling alone.

In a fourth aspect, the present invention resides in a superconducting magnet control system of a satellite or a spacecraft for position control of said satellite or spacecraft, wherein, said superconducting magnet control system comprises:
at least one superconducting electromagnet comprising or mounted to at least one cooling element; and
at least one cryocooler;
wherein, said at least one cryocooler is thermally coupled to said at least one cooling element to cool said at least one superconducting electromagnet or at least one or more components thereof through said at least one cooling element by conduction cooling alone.

In a fifth aspect, the present invention resides in a spacecraft comprising:
a chassis; and
a superconducting magnet control system mounted to or within at least a portion of said chassis for position control of said spacecraft,
wherein, said superconducting magnet control system comprises:
at least one superconducting electromagnet comprising or mounted to at least one cooling element; and
at least one cryocooler; and
wherein, said at least one cryocooler is thermally coupled to said at least one cooling element to cool said at least one superconducting electromagnet or at least one or more components thereof through said at least one cooling element by conduction cooling alone.

In a sixth aspect, the present invention resides in a spacecraft comprising:
a chassis; and
a superconducting magnet control system mounted to or within at least a portion of the chassis for position control of said spacecraft, said superconducting magnet control system comprising:
at least one superconducting electromagnet;
at least one power source;
at least one control device;
at least one cryocooler; and
at least one electromagnetic flux injection device;
wherein, said at least one electromagnetic flux injection device is operatively coupled to said at least one control device and is configured to derive energy from said at least one power source to energise said at least one superconducting electromagnet,
wherein, said at least one cryocooler is operatively coupled to said at least one control device and to said at least one power source, wherein based on a control signal from the control device said at least one cryocooler is configured to derive energy from said at least one power source to cool said at least one superconducting electromagnet or at least one or more components thereof by conduction cooling alone, and
wherein, said at least one superconducting electromagnet comprises or is mounted to at least one cooling element and said at least one cryocooler is thermally coupled to at least one cooling element to cool said at least one cooling element, thereby also cooling said at least one superconducting electromagnet or at least one or more components thereof by conduction cooling alone.

For the invention(s) as defined in at least the first, second, third, fourth, fifth and/or sixth aspects above, the features defined by one or more of the statements below may preferably apply, as appropriate.

In one embodiment, said at least one cryocooler is thermally coupled to said at least one cooling element for cooling said at least one cooling element so that when said at least one cooling element is at a lower temperature than said superconducting electromagnet or at least said one or more components thereof, a transfer of heat through said at least one cooling element causes conduction cooling of said superconducting electromagnet or at least said one or more components thereof.

In one embodiment, said at least one cooling element is a cooling plate.

In one embodiment, said at least one cooling element is a metallic or a non-metallic cooling plate.

In one embodiment, said at least one superconducting electromagnet is thermally coupled to said at least one cryocooler with at least one thermal strap.

In one embodiment, said at least one superconducting electromagnet is thermally coupled to said at least one cryocooler with at least one metallic link.

In one embodiment, said at least one cooling element is made of copper.

In one embodiment, said at least one superconducting electromagnet is a High Temperature Superconductor (HTS) electromagnet.

In one embodiment, said at least one HTS electromagnet has at least one permeable core.

In one embodiment, said at least one permeable core has a relative magnetic permeability greater than that of conventional cores such as iron cores.

In one embodiment, said at least one permeable core has a relative magnetic permeability greater than 5000.

In one embodiment, said at least one superconducting electromagnet comprises at least one coil, and wherein said at least one cooling plate is in thermal contact with said at least one coil.

In one embodiment, said at least one superconducting electromagnet comprises at least one coil, and wherein said at least one superconducting electromagnet comprises or is mounted to at least two cooling elements that are in thermal contact with said at least one coil, said cooling elements being a top cooling element and a bottom cooling element, wherein said at least one coil is sandwiched between said top cooling elements and said bottom cooling elements.

In one embodiment, the top cooling element is a top cooling plate.

In one embodiment, the bottom cooling element is a bottom cooling plate.

In one embodiment, at least one of said top and bottom cooling elements is substantially hexagonal in shape.

In one embodiment, at least one of said top and bottom cooling elements is made from copper.

In one embodiment, at least one of said top and bottom cooling elements is 2 mm in thickness.

In one embodiment, at least one of said top and bottom cooling elements comprises six holes, preferably, six 3 mm holes on 66 mm diameter.

In one embodiment, said superconducting electromagnet comprises two pole pieces with a magnetic field sensor sandwiched between said pole pieces.

In one embodiment, a thermal link is provided between said top and bottom cooling elements to thermally couple said top and bottom cooling elements.

In one embodiment, said at least one coil is an HTS coil based on Yttrium barium copper oxide (YBCO) 2G (second generation).

In one embodiment, said at least one coil is made from approximately 100 m long, 3 mm wide, 50 μm thick tape or wire.

In one embodiment, said at least one coil has 60 mm outer diameter.

In one embodiment, said at least one coil uses approximately 100 m of tape and is dry-wound without inter-turn insulation or is embedded in a matrix with insulation.

In one embodiment, said at least one superconducting electromagnet further comprises a cylindrical magnet bore.

In one embodiment, said cylindrical magnet bore has an outside diameter of about 10 mm and inside diameter of about 8 mm.

In one embodiment, said at least one coil is wrapped around said cylindrical magnet bore.

In one embodiment, said at least one coil is a double pancake coil.

In one embodiment, said double pancake coil is a HTS wire double pancake coil.

In one embodiment, said double pancake coil is a HTS wire double pancake coil, based on Yttrium barium copper oxide (YBCO) 2G (second generation).

In one embodiment, an insulation sheet is provided between said at least one coil and said cooling elements to reduce electrical shorting.

In one embodiment, said insulation sheet is a G10 insulation sheet.

In one embodiment, windings of said at least one coil terminates on a current bus.

In one embodiment, thermal grease is applied to each interface of said at least one superconducting electromagnet that is a thermal interface.

In one embodiment, said at least one superconducting electromagnet comprises at least one yoke plate that is attached to an exterior surface of said at least one of said top and bottom cooling elements.

In one embodiment, said at least one yoke plate is a mild steel yoke plate.

In one embodiment, said at least one yoke plate is a mild steel magnetic yoke plate.

In one embodiment, said at least one yoke plates is screwed or lightly screwed to at least one of said top and bottom cooling elements.

In one embodiment, a securement means is provided to clamp said top and bottom cooling elements securely for thermal contact with said at least one coil.

In one embodiment, said securement means is one or more brackets.

In one embodiment, said one or more brackets are made out of stainless steel.

In one embodiment, said at least one cryocooler is selected from a Stirling cryocooler, a pulse tube tactical cryocooler or a pulse tube miniature tactical cryocooler.

In one embodiment, said superconducting magnet control system further comprises:
  at least one power source; and
  at least one control device;
    said at least one cryocooler being operatively coupled to said at least one control device and to at least one power source, wherein based on a control signal from the control device said at least one cryocooler is configured to derive energy from said at least one power source to cool said at least one superconducting electromagnet or at least one or more components thereof.

In one embodiment said satellite or spacecraft further comprises a set of reaction wheels that is operatively coupled to said at least one power source and said at least one control device.

In one embodiment, said set of reaction wheels comprises three reaction wheels.

In one embodiment, said set of reaction wheels are orthogonal to each other.

In one embodiment, said set of reaction wheels derives energy from said at least one power source.

In one embodiment, operation of said set of reaction wheels is controlled by said at least one control device.

In one embodiment, said at least one control device comprises an on-board computer.

In one embodiment, said at least one control device comprises a microprocessor.

In one embodiment, said microprocessor is a programmable microprocessor.

In one embodiment, said at least one control device comprises a control board.

In one embodiment, said at least one control device derives energy from said at least one power source.

In one embodiment, said at least one control device is configured to control at least one of a timing, a magnitude and a polarity of a magnetic field in said at least one superconducting electromagnet.

In one embodiment, said at least one control device is configured to control a timing of said at least one cryocooler to cool said at least one superconducting electromagnet.

In one embodiment, said at least one cryocooler is controlled by said at least one control device to derive energy from said at least one power source to cool said at least one superconducting electromagnet.

In one embodiment, said at least one power source comprises at least one solar panel.

In one embodiment, said at least one power source is a battery.

In one embodiment, said battery is a rechargeable battery.

In one embodiment, said at least one power source is a capacitor.

In one embodiment, said superconducting magnet control system further comprises at least one electromagnetic flux injection device that is operatively coupled to said at least one control device and is configured to derive energy from said at least one power source to energise said at least one superconducting electromagnet.

In one embodiment, said at least one electromagnetic flux injection device is controlled by said at least one control device to derive energy from said at least one power source to energise said at least one superconducting electromagnet.

In one embodiment, said at least one electromagnetic flux injection device is an electromagnetic flux pump.

In one embodiment, said at least one electromagnetic flux pump is a linear flux pump.

In one embodiment, said at least one electromagnetic flux pump is contactless.

In one embodiment, said at least one electromagnetic flux pump comprises a plurality of solenoids.

In one embodiment, said at least one electromagnetic flux pump comprises a plurality of solenoids that are copper solenoids with an iron core, or solenoids each having copper coil with an iron core.

In one embodiment, said iron core of each of said plurality of solenoids extend between a first end portion and a second end portion, each first end portion being attached to a common iron frame, wherein, there is a plurality of cubic pieces of iron and each second end portion being attached to one and independent cubic piece from said plurality of cubic pieces.

In one embodiment, said frame is square or is substantially square in shape having a first side, a second side, a third side and a fourth side, said first side being opposite said third side and said second side being opposite said fourth side.

In one embodiment, said at least one electromagnetic flux pump comprises six solenoids, with said first end portion of said iron core of each of three solenoids being attached to a first side of said frame, and said first end portion of said iron core of each of said remaining three solenoids being attached to said third side of said frame, wherein each of said cubic pieces attached to said second end portions are spaced apart from one another.

In one embodiment, said at least one electromagnetic flux pump is a non-linear flux pump.

In one embodiment, said at least one electromagnetic flux pump comprises permanent magnets.

In one embodiment, said at least one electromagnetic flux pump is located at a distance from said at least one superconducting electromagnet.

In one embodiment, said at least one electromagnet is mounted to the chassis of the satellite or spacecraft but at a distance from said at least one superconducting electromagnet.

In one embodiment, said electromagnetic flux pump is configured to magnetise said at least one coil, said at least one coil being HTS coil or HTS tape.

In one embodiment, said chassis is hollow cubical or hollow cuboid in shape comprising a plurality of walls.

In one embodiment, said at least one superconducting electromagnet is located in at least one of said walls.

In one embodiment, said satellite or spacecraft has a total mass of at least 500 kg or more.

In one embodiment, said satellite or spacecraft has a total mass of less than 500 kg.

In one embodiment, said satellite is a pico-satellite or a nano-satellite.

In one embodiment, said satellite is a CubeSat (a U-class spacecraft) comprising at least one unit.

In one embodiment, said satellite comprises two or more units that are adjacent to each other.

In one embodiment, said chassis comprises a frame structure, said frame structure being formed by four substantially vertical rails that are spaced apart from each other and four substantially horizontal rails that are also spaced apart from each other, said frame structure being a four-sided polygonal shape in cross-section in a plane that is orthogonal to a longitudinal axis of each of said substantially vertical rails,
   wherein, in said frame structure, each of said four substantially vertical rails is connected to two of the other three substantially vertical rails via two of said substantially horizontal rails that are substantially vertically spaced apart from one another and also are substantially orthogonal to each other.

In one embodiment, said four-sided polygonal shape is a square or a rectangle.

In one embodiment, said substantially vertical rails and said substantially horizontal rails are integrally formed.

In one embodiment, each substantially vertical rail comprises a first end portion and a second end portion and extends longitudinally from said first end portion to said second end portion, and in each substantially vertical rail, one of said substantially horizontal rails is located at or proximal to said first end portion and another one of the substantially horizontal rails is located at or proximal to the second end portion.

In one embodiment, at least a portion of each substantially vertical rail is L-shaped in cross-section in a plane that is orthogonal to a longitudinal axis of that vertical rail.

In one embodiment, each substantially vertical rail comprises a first end portion and second end portion and extends longitudinally from said first end portion to said second end portion, and in each substantially vertical rail, one of said substantially horizontal rails is located at or proximal to said first end portion and another one of the substantially horizontal rails is located at or proximal to said second end portion.

In one embodiment, at least one of said first end portion and said second end portion of each substantially vertical rail comprises a plate member.

In one embodiment, said plate member is integrally formed with said substantially vertical rails.

In one embodiment, said four substantially vertical rails are of same length.

In one embodiment, at least one of said substantially vertical rails have a plurality of spaced apart apertures along its length.

In one embodiment, said plurality of spaced apart apertures are configured to accommodate countersunk screws.

In one embodiment, said four substantially horizontal rails are of same length.

In one embodiment, internal volume of said chassis is cubical or cuboid.

In one embodiment, said chassis is constructed of a material that is rigid.

In one embodiment, said chassis is constructed of 3D-printed titanium.

In one embodiment, said satellite or spacecraft is configured to be used in a magnetic field.

In one embodiment, said magnetic field is a natural magnetic field or an artificial magnetic field.

In one embodiment, said magnetic field is a natural magnetic field of the earth or a celestial body.

In one embodiment, said magnetic field is a magnetic field of at least one another satellite or spacecraft.

In a seventh aspect, the present invention resides in a chassis for a satellite or a spacecraft comprising a frame structure, said frame structure being formed by four substantially vertical rails that are spaced apart from each other and four substantially horizontal rails that are also spaced apart from each other, said frame structure being a four-sided polygonal shape in cross-section in a plane that is orthogonal to a longitudinal axis of each of said substantially vertical rails,
   wherein, in said frame structure, each of said four substantially vertical rails is connected to two of the other three substantially vertical rails via two of said substantially horizontal rails that are substantially vertically spaced apart from one another and are also substantially orthogonal to each other.

In one embodiment, said four-sided polygonal shape is a square or a rectangle.

In one embodiment, said substantially vertical rails and said substantially horizontal rails are integrally formed.

In one embodiment, each substantially vertical rail comprises a first end portion and second end portion and extends longitudinally from said first end portion to said second end portion, and in each substantially vertical rail, one of said substantially horizontal rails is located at or proximal to said first end portion and another one of the substantially horizontal rails is located at or proximal to said second end portion.

In one embodiment, at least one of said first end portion and said second end portion of each substantially vertical rail comprises a plate member.

In one embodiment, said plate member is integrally formed with said substantially vertical rails.

In one embodiment, at least a portion of each substantially vertical rails is L-shaped in cross-section in a plane that is orthogonal to a longitudinal axis of that substantially vertical rail.

In one embodiment, said four substantially vertical rails are of same length.

In one embodiment, at least one of said substantially vertical rails have a plurality of spaced apart apertures along its length.

In one embodiment, said plurality of spaced apart apertures are configured to accommodate countersunk screws.

In one embodiment, said four substantially horizontal rails are of same length.

In one embodiment, internal volume of said chassis is cubical or cuboid.

In one embodiment, said chassis is constructed of a material that is rigid.

In one embodiment, said chassis is constructed of 3D-printed titanium.

In one embodiment, said chassis is configured to be used to support a satellite or a spacecraft as defined in any one of the above aspects.

In an eighth aspect, the present invention resides in a satellite or a spacecraft comprising a chassis as defined in the fifth aspect.

In one embodiment, said satellite or a spacecraft is configured to be used in a magnetic field In one embodiment, said magnetic field is a natural or an artificial magnetic field.

In one embodiment, said superconducting electromagnet of the third aspect is configured to be used with the satellite or spacecraft as defined in any one of the first and second aspects.

In a ninth aspect, the present invention resides in a satellite or a spacecraft comprising at least one superconducting electromagnet as defined in the third aspect.

In a tenth aspect, the present invention resides in a method of cooling a superconducting electromagnet of a satellite or a spacecraft, the method comprising the steps of:
    providing a satellite or a spacecraft comprising a superconducting magnet control system for position control of said satellite or spacecraft having at least one superconducting electromagnet comprising or mounted to at least one cooling element,
    thermally coupling at least one cryocooler to said at least one cooling element to cool said at least one superconducting electromagnet or at least one or more components thereof through said at least one cooling element by conduction cooling alone.

In one embodiment, the method comprises cooling said at least one cooling element to a lower temperature than said superconducting electromagnet or at least said one or more components thereof so that transfer of heat through said at least one cooling element causes conduction cooling of said superconducting electromagnet or at least said one or more components thereof.

In one embodiment, said at least one superconducting electromagnet further comprises at least one power source, at least one control device and at least one electromagnetic flux injection device that are mounted to a portion of a chassis; and the method further comprises:
    using said control device and said electromagnetic flux injection device to energize said at least one superconducting electromagnet for position control of said satellite or spacecraft.

In one embodiment, said satellite or spacecraft is the one as defined in any one of the above aspects.

In an eleventh aspect, the present invention resides in a method of mounting one or more components in a satellite or a spacecraft, the method comprising the steps of:
    providing a satellite or a spacecraft having at least a chassis and an electromagnetic control system,
    mounting said electromagnetic control system to a portion of said chassis in such a manner that interior space of said satellite or spacecraft is not occupied.

In one embodiment, the method further comprises using at least one control device to control at least one of a timing, a magnitude and a polarity of magnetic field in said at least one superconducting electromagnet.

In one embodiment, the method further comprises using said at least one control device to control a timing of said at least one cryocooler to cool said at least one superconducting electromagnet.

In one embodiment, the method further comprises using said at least one control device to control said at least one cryocooler to derive energy from said at least one power source to cool said at least one superconducting electromagnet.

In one embodiment, said satellite or spacecraft is the one as defined in any one of the above aspects.

Other aspects of the invention may become apparent from the following description which is given by way of example only and with reference to the accompanying drawings.

In this specification where reference has been made to patent specifications, other external documents, or other sources of information, this is generally for the purpose of providing a context for discussing the features of the invention. Unless specifically stated otherwise, any reference to such external documents is not to be construed as an admission that such documents, or such sources of information, in any jurisdiction, are prior art, or form part of the common general knowledge in the art.

For the purpose of this specification, where method steps are described in sequence, the sequence does not necessarily mean that the steps are to be chronologically ordered in that sequence unless there is no other logical manner of interpreting the sequence.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following description are simply exemplary embodiments of the invention. Hence, specific dimensions and other physical characteristics related to the embodiments disclosed herein are not to be considered as limiting.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references but also other non-specified components or elements. This rationale will also be used when the term 'comprises' or 'comprised' or 'comprising' is used in relation to the apparatus or to one or more steps in a method or process.

As used hereinbefore and hereinafter, the term "and/or" means "and" or "or", or both.

As used hereinbefore and hereinafter, "(s)" following a noun means the plural and/or singular forms of the noun.

When used in a claim and unless stated otherwise, the word 'for' is to be interpreted to mean only 'suitable for', and not for example, specifically 'adapted' or 'configured' for the purpose that is stated.

As used hereinbefore and hereinafter, and unless specifically stated otherwise, the term 'satellite' is to be interpreted to mean an artificial satellite that is a man-made satellite.

As used hereinbefore and hereinafter, and unless specifically stated otherwise, the term 'conduction cooling' is to be interpreted to mean cooling using heat transfer through a conductive element(s) (i.e. cooling element(s)) that is/are in direct contact with the component(s) to be cooled, the conductive element(s) being thermally coupled to the cryocooler(s) for cooling of the conductive element(s), and the term 'conduction cooling' excludes any other alternative cooling technique(s) that is not 'conduction cooling'.

As used hereinbefore and hereinafter, and unless specifically stated otherwise, the term 'position control' is to be interpreted to mean attitude control, altitude control and/or relative position control (i.e. relative position control using a magnetic field of a nearby satellite) of a satellite using an electromagnetic control system of that satellite.

As used hereinbefore and hereinafter, and unless specifically stated otherwise, the term 'cooling element' is to be interpreted to mean a thermally conductive element that is suitable for use in conduction cooling.

It is known that the word 'substantially' can in some instances, be used to broaden the term. It should be stated that, in this specification, use of the word 'substantially' with a term, to define a characterizing feature(s), gets all the benefit (i.e. benefit of any broadening) afforded by the use of the word 'substantially', and also includes within its scope the feature(s) being that term exactly, (without broadening). For example, if a feature is described/defined in the present specification as being 'substantially vertical' then that includes, within its scope, the feature being 'close' to vertical (in so far the word 'substantially' is deemed to broaden the term 'vertical'), and also includes within its scope the feature being 'exactly' vertical.

BRIEF DESCRIPTION OF THE DRAWINGS

The invention will now be described by way of example only and with reference to the drawings in which.

DETAILED DESCRIPTION

In the description below, unless otherwise stated satellite also refers to a satellite system and therefore the words 'satellite' and 'satellite system' may be used interchangeably throughout the specification.

Magnetic propulsion systems are based on the direct interaction of the vehicle's own magnetic field a non-uniform external magnetic field, for instance, the geomagnetic one, without using jet propulsion (Pulatov, V. (2001). Magnetic propulsion systems Progress in Aerospace Sciences 37, 245-261, the entirety of which is herein incorporated by reference).

The force arising from a dipole-dipole interaction is fundamental to the magnetic propulsion system.

In our solar system, the Sun, as well as a number of other objects, possess a natural magnetic field. Some of these fields, subject to their intensity, can be used for satellite propulsion. Low thrust propulsion is achievable in any, however small, non-uniform external magnetic field. However, strong and dipole-like fields are favourable. The magnetic field of the Earth is understood comparatively well.

Although complex, the geomagnetic field can be well approximated by that of a dipole (Walt, Martin (1994). Introduction to Geomagnetically Trapped Radiation. New York, NY: Cambridge University Press. pp. 29-33 the entirety of which is herein incorporated by reference).

The magnetic propulsion system, at its simplest form, is constituted by a solenoid, hence giving rise to an on-board magnetic dipole.

Figure 1:
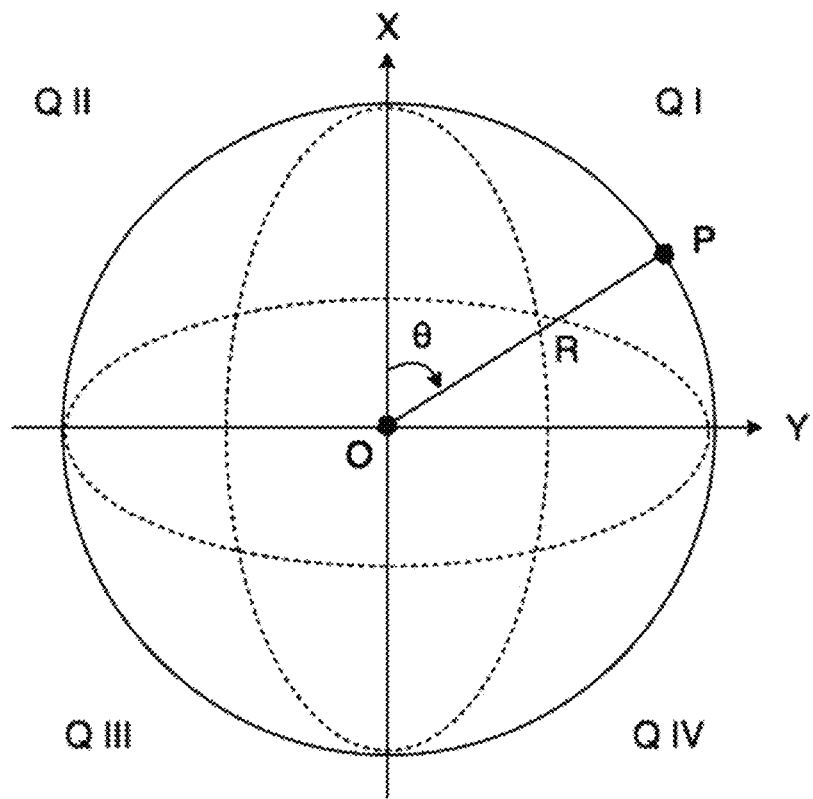
FIG. 1: shows a coordinate system where Points O and P mark the locations of the centres of the magnetic dipoles of the Earth and the on-board magnetic dipole generated by an HTS electromagnet.

The coordinate system is defined in FIG. 1. In FIG. 1, Points O and P mark the locations of the centres of the magnetic dipoles of the Earth and the on-board solenoid (which is coincident with the on-board dipole) respectively.
Dipolar Coupling The electrodynamic force arising from the dipole-dipole interaction can be represented by two components: radial $F_R$ and tangential Fe. The magnitude of these components can be numerically estimated by Equations 1 and 2 (Pulatov, V. (2001). Magnetic propulsion systems Progress in Aerospace Sciences 37, 245-261, the entirety of which is herein incorporated by reference):

$$F_R = -\frac{3\mu_0 M_E M_P (3 \cos^2 \theta + 1)^{\frac{1}{2}}}{(4\pi R^4)} \quad (1)$$

$$F_\theta = -3\mu_0 M_E M_P \frac{2 \sin(2\theta)}{(3 \cos^2 \theta + 1)^{\frac{1}{2}} (8\pi R^4)} \quad (2)$$

where μo is the permeability of empty space, R is the distance between the Earth's centre and the centre of the solenoid, θ is the attitude and, $M_E$ is the magnetic moments of the Earth, and $M_P$ is the propulsion system.

Figure 2:
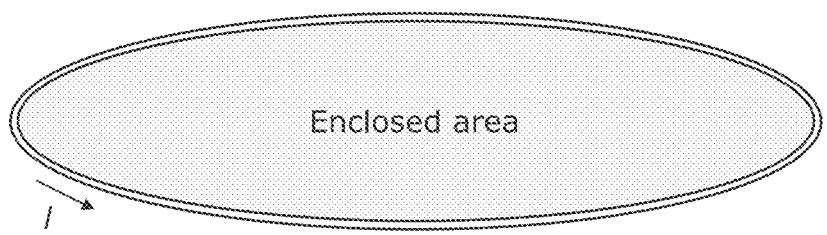
FIG. 2: shows a closed loop and an enclosed area used for magnetic moment calculations.

The magnetic moment of the propulsion system $M_p$ is determined by the properties of the solenoid and its current I, according to Equation 3 below.

$$M_p = \frac{ANI}{L} \quad (3)$$

where A is the area enclosed by the solenoid (see FIG. 2) and N is the number of turns.
Magnetic Moment At all time, the solenoid is subject to an electrodynamic torque, which is described by Equation 4:

$$\tau = M_p B_0 \sin \alpha \quad (4)$$

where $B_o$ is the magnetic induction vector of the Earth's magnetic field, the angle between vectors $B_o$, and $M_p$ is denoted by a. It can be observed that the torque is inexistent when the two vectors are aligned (i.e. a=0). This position of perfect alignment can be referred to as an equilibrium position.

The radial force $F_R$ acting on the solenoid in the equilibrium position is directed towards O (the centre of the Earth). However, the direction of the tangential force Fe is position-dependent. It is positive (aligned with the velocity) in quarters I and III (see FIG. 1); negative (opposed to the velocity) in quarters II and IV, or vice-versa, depending on the direction of the orbital motion.
Superconductivity The phenomenon of superconductivity can be utilised to generate a stronger on-board magnetic field at a lower energy cost.

It is evident from Equations 1-3 above that the magnitude of the generated forces is directly proportional to the magnitude of the electric current I. A modern high-temperature superconducting wire can facilitate electric current of up to 540 Amperes/cm. Such current can be maintained in a solenoid for many years with little or no energy input. To preserve these properties, the wire is kept below its threshold superconducting temperature $T_c$, critical current density $J_c$ and magnetic field density $B_c$.

While superconducting temperature threshold Tc is specific to the material choice, other critical values, $J_c$ (critical current density) and $B_c$ (critical magnetic field density), are dependent on the operative temperature as per Equations 5 and 6 (Dadhich, A. & Schaffner, G. (2016). Electromagnetic Propulsion system for spacecrafts using geomagnetic fields and superconductors, San Diego, 4-8 January, the entirety of which is herein incorporated by reference).

$$J_c(T) = J_c(0)\left[1 - \left(\frac{T}{T_c}\right)^2\right] \quad (5)$$

$$B_c(T) = B_c(0)\left[1 - \left(\frac{T}{T_c}\right)^2\right] \quad (6)$$

It is evident that the lower the operating temperature T is, the higher current density $J_c$ and magnetic field $B_c$ can be tolerated by a superconducting wire before its properties vanish.

Electromagnetic control systems can be used for position control of the satellite. The position control may include attitude control, altitude control and/or relative position control (i.e. relative position control using a magnetic field of a nearby satellite). Such satellite would utilise coils of wires attached to it for carrying a current to induce a magnetic field to interact with the magnetic field of Earth or other celestial body(ies) or of a nearby satellite(s), for position control of the satellite in the outer space. The present invention involves the use of a superconductive electromagnet maintained in a temperature region at which superconductivity occurs. Therefore, once a current flow is established in the coil or loop of the electromagnet, the current will continue to flow in the superconducting material requiring little or no additional energy.

It can be appreciated that due to a lack of atmosphere, there is no element that can freeze on a cryocooler in the outer space. Therefore, a cryocooler that is thermally coupled to the electromagnet will be suitable for use in order to keep the electromagnet or the electromagnet coil cold enough to be in the superconducting state.

A small satellite is a satellite of mass that is less or equal to 500 kg.

The desire for greater and sustainable manoeuvrability is driven by a need for: a controlled de-orbiting from higher orbits; control over satellite orientation for communication or earth observation; synchronisation of satellite positioning in satellite constellations; orbit correction; in-orbit assembly of a complex satellite; close proximity operations etc.

It is desirable to provide manoeuvrability of satellites such as but not limited small satellites that require a compact but relatively high-field electromagnet. It is desirable to design and build a superconducting electromagnet such as high temperature superconductive (HTS) wire that provides the feasibility of achieving the required magnetic field in the satellite environment.

Several examples/embodiments of or for use in the present invention will now be described.

Figure 3:
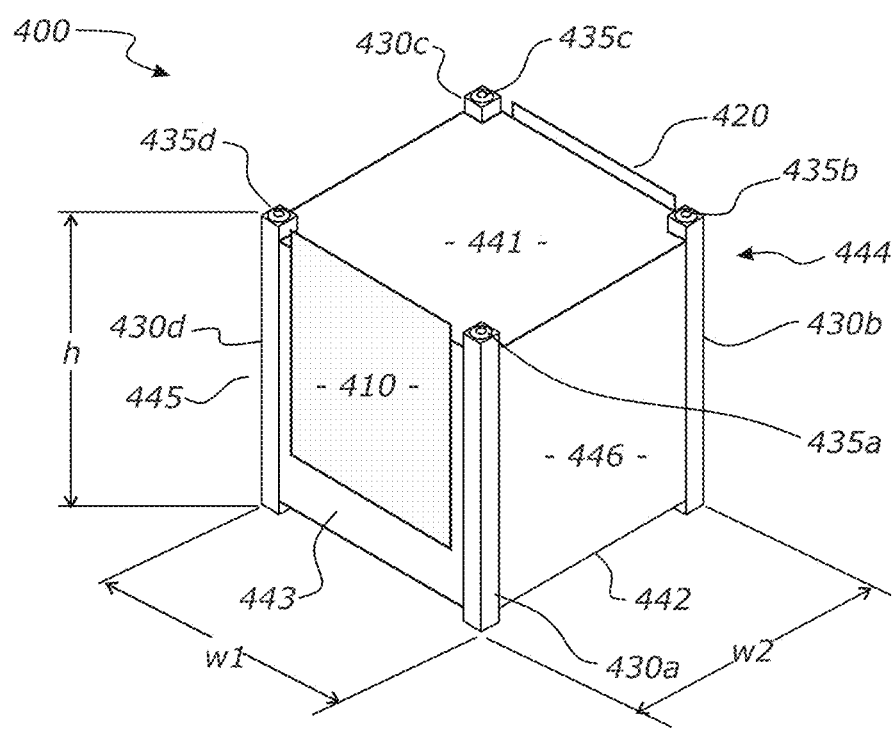
FIG. 3: shows an example of a 1-unit satellite that is suitable for use in the present invention.

Reference will now be made to FIG. 3 which shows an example of a 1-unit satellite 400 that is suitable for use in the present invention. It is to be understood that present invention is not limited for use with such 1-unit satellite 400 and can be used with many other types of satellites. The 1-unit satellite 400 comprises six sides namely, top side 441, bottom side 442, left side 446, right side 445, front side 443 and rear side 444. The 1-unit satellite has a standardized form factor bounded by the height h, width w1 and depth w2. By way of example, the height h is about 113.5 mm and the width w1 and the depth w2 are about 100.0 mm. An access port 410 may be provided in one side (e.g. the front side 443) and an access port 420 may be provided on another side (e.g. the rear side 444). The access ports 410 and 420 may provide access to the internal volume of the single unit satellite. There are four rails 430a-430d and each end 435a-d of the rails 430a-430d can include one or more deployment switches and/or separation springs that assist in the deployment and/or separation of the satellite 400 from the launch/deployment vehicle. The 1-unit satellite 400 may have a mass of approximately 1.33 kg or more. The nominal available power for one-unit satellite may be between 2 to 10 Watts.

Figure 4:
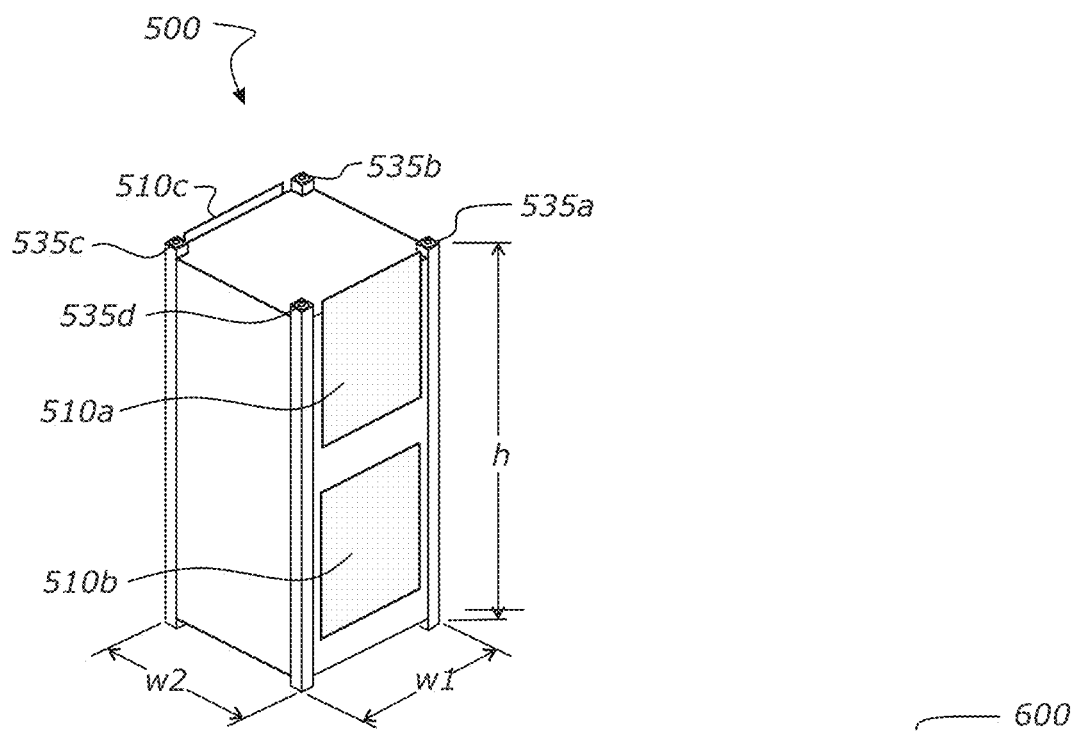
FIG. 4: shows an example of a 2-unit satellite that is suitable for use in the present invention.

FIG. 4 shows an example of a 2-unit satellite 500 that is suitable for use in the present invention. It is to be understood that present invention is not limited for use with such 2-unit satellite 500 and can be used with many other types of satellites. As shown, satellite 500 comprises two units that are adjacent to each other. This 2-unit satellite 500 has may have the same width w1 and depth w2 as the 1-unit satellite 400 shown in FIG. 3. The 2-unit satellite may have a height h of approximately two times the height h of 1-unit satellite shown in FIG. 3. Also, there may be two access ports 510a, 510b on one side (e.g. the left-hand side) and two access ports (only one access port 510c is shown in FIG. 4) on the other side (e.g. the right-hand side). The access ports 510a, 510b may provide access to the internal volume of the 2-unit satellite 500. Similar to the 1-unit satellite 400, each end 535a, 535b, 535c, 535d of the rails of this 2-unit satellite can include one or more deployment switches and/or separation springs that assist in the deployment and/or separation of the satellite 500 from the launch/deployment vehicle. Each unit of the satellite 500 may have a mass of approximately 1.33 kg or more. The nominal available power for each unit may be between 2 to 10 Watts.

Figure 5:
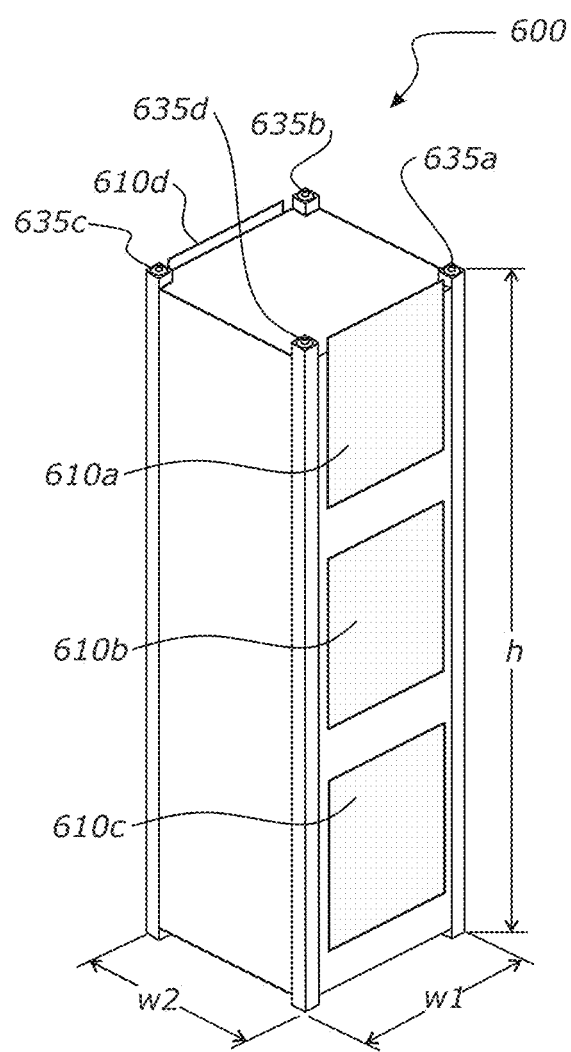
FIG. 5: shows an example of a 3-unit satellite that is suitable for use in the present invention.

FIG. 5 shows an example of a 3-unit satellite 600 that is suitable for use in the present invention. It is to be understood that present invention is not limited for use with such 2-unit satellite 500 and can be used with many other types of satellites. As shown, satellite 600 comprises three units that are adjacent to each other. This 3-unit satellite 600 has may have the same width w1 and depth w2 as the 1-unit satellite 400 shown in FIGS. 3 and 2-unit satellite 500 shown in FIG. 4. The 3-unit satellite may have a height h of approximately three times the height of 1-unit satellite shown in FIG. 3. Also, there may be three access ports 610a, 610b and 610c on one side (e.g. the left-hand side) and three access ports (only one access port 610d is shown in FIG. 5) on another side (e.g. the right-hand side). The access ports 610a, 610b, 610c may provide access to the internal volume of the 3-unit satellite 600. Similar to the 1-unit satellite 400 and 2-unit satellite 500, each end 635a, 635b, 635c, 635d of the rails of this 3-unit satellite can include one or more deployment switches and/or separation springs that assist in the deployment and/or separation of the satellite 600 from the launch/deployment vehicle. Each unit of the satellite 600 may have a mass of approximately 1.33 kg or more. The nominal available power for each unit may be between 2 to 10 Watts.

Design specifications and basic concepts of CubeSats (U-class spacecraft) can be found in CubeSat website http://www.cubesat.org/, the entirety of which is herein incorporated by reference.

Figure 6A:
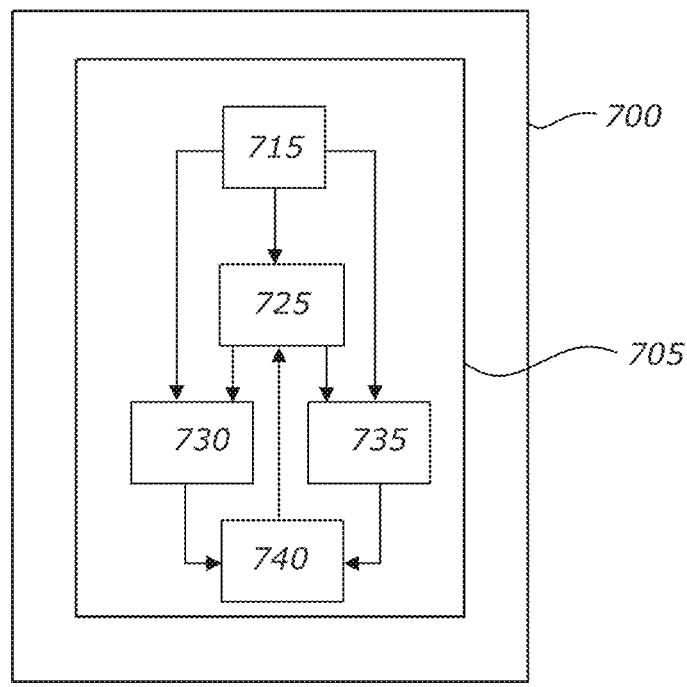
FIG. 6A: shows a schematic flow diagram of a satellite according to one preferred embodiment of the present invention.

FIG. 6A shows a schematic flow diagram of a satellite 700 according to one preferred embodiment of the present invention. The satellite 700 may be a small satellite (i.e. a satellite of mass of 500 kg or less) which can include a pico-satellite, a nano-satellite such as a CubeSat (U-class aircraft) as described above with reference to FIGS. 3-5. Alternatively, the satellite 700 may be a bigger satellite having a mass that is more than 500 kg.

Figure 6B:
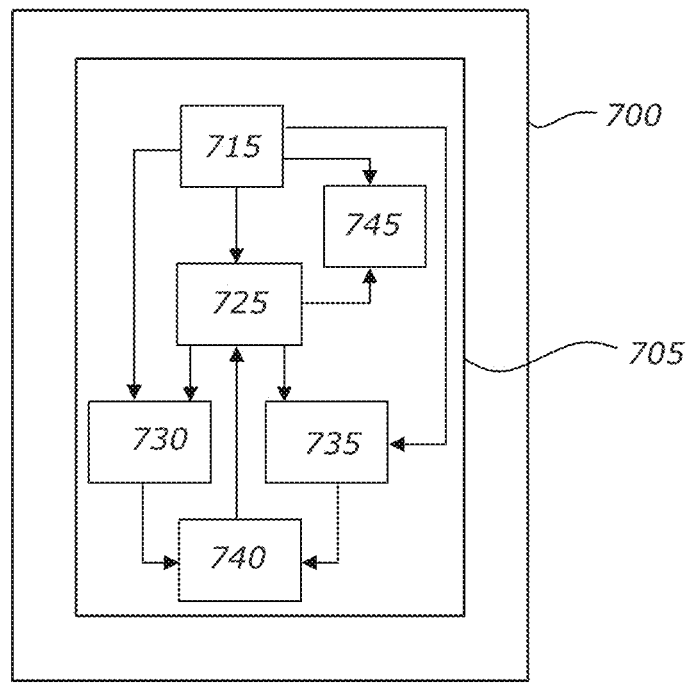
FIG. 6B: shows a schematic flow diagram of a satellite according to another preferred embodiment of the present invention.

FIG. 6B shows a schematic flow diagram of a satellite 700 according to another preferred embodiment of the present invention. The satellite 700 shown in FIGS. 6A and 6B are substantially the same except that FIG. 6B also show a set of reaction wheels 745, that the satellite 700 may comprise. There may be three reaction wheels (or three orthogonal reaction wheels) in the set of reaction wheels 745. A skilled person will appreciate that the reaction wheels may be beneficial to the system and may be required for certain functionality. The set of reaction wheels 745 may derive energy from the power source 715. The operation of the at least three reaction wheels may be controlled by the control device 725.

Figure 7:
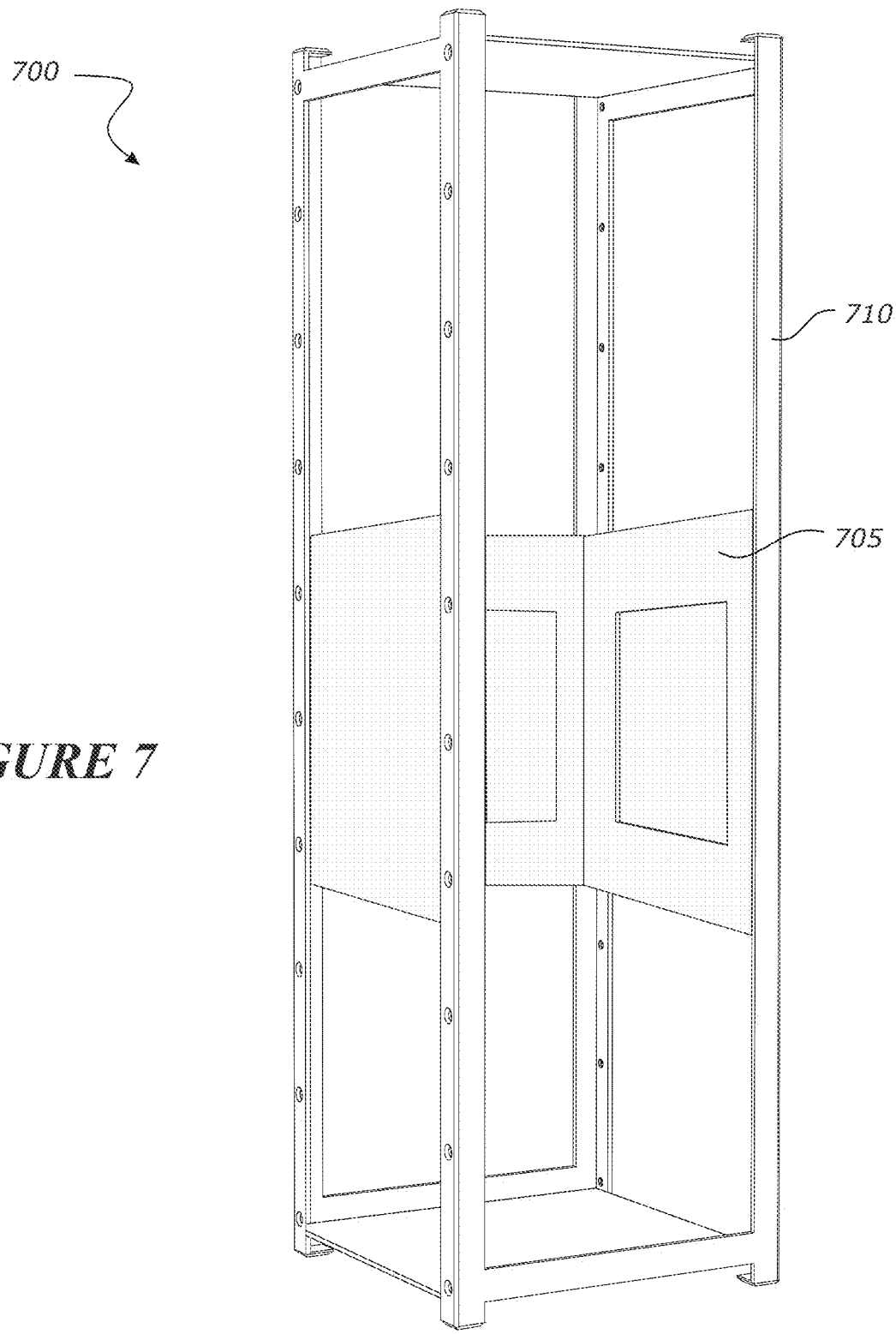
FIG. 7: shows panels mounted to a portion of a chassis of the satellite. The top and bottom panels and the panels on three sides of the chassis are shown and the panel on one of the side chassis is removed to show the other three panels.

FIG. 7 shows panels mounted to a portion of a chassis 710. The panels may comprise electromagnet(s) for position control of the satellite. The top and bottom panels and the panels on three sides of the chassis are shown and the panel on one of the side chassis is removed to show the other three panels. Three orthogonal electromagnets may be required to achieve the greatest control over the satellite's position. The electromagnets can be split in 2 (hence resulting in 6 magnets in total) to achieve uniform mass distribution.

The satellite 700 may comprise the chassis 710. A superconducting magnet control system 705 may be mounted to or within at least a portion of the chassis 710 for position control of the satellite 700. As shown schematically in FIGS. 6A and 6B, the superconducting magnet control system 705 comprises at least one cryocooler 735 and at least one superconducting electromagnet 740. The cryocooler 735 may be operatively coupled to the control device 725. Most preferably, the cryocooler 735 is configured to derive energy from the power source 715 to cool the at least one superconducting electromagnet 740 based on a control signal from the control device 725.

Most preferably, the superconducting magnet system 705 may further comprise at least one power source 715, at least one control device 725 and at least one electromagnetic flux injection device 730. More than one cryocooler, power source 715, control device 725, and electromagnetic flux injection device 730 and/or cryocooler 735 may be present in the superconducting magnet control system 705. The electromagnetic flux injection device 730 may be operatively coupled to the control device 725 and may be configured to derive energy from the at least one power source 715 to energise the superconducting electromagnet 740 which then allows for magnetic/electromagnetic attitude control and/or altitude control of the satellite 700. The components of the electromagnetic control system 705 may be mounted to the chassis, and depending upon the functionality, they may either be physically coupled to each other (e.g. via mechanical and/or thermal link) or may be spaced apart from one another other. The electromagnetic flux injection device 730 are preferably spaced apart from each other, i.e. preferably located at a distance from the superconducting electromagnet 740.

As shown in FIG. 6B, the satellite 700 can further comprise a set of reaction wheels 745. There may be three reaction wheels (or three orthogonal reaction wheels) in the set of reaction wheels 745.

The control device 725 may comprise or be in the form of an on-board computer or a microprocessor (e.g. a programmable microprocessor or a control board). The control device 725 may feed data a magnetic field sensor (magnetometer).

The control device 725 may derive energy from the power source 715.

The control device 725 may be configured to control a timing, a magnitude, a polarity and/or other relevant property(ies) (e.g. rate of change) of the magnetic field in the superconducting electromagnet 740.

The control device 725 may also be configured to control one or more parameters of the cryocooler 735 such as a timing of the cryocooler 735 to cool the superconducting electromagnet 740.

The electromagnetic flux injection device 730 may be controlled by the control device 725 to derive energy from the power source to energise the superconducting electromagnet 740.

Similarly, the cryocooler 735 may be controlled by the control device 725 to derive energy from the at least one power source 715 to cool the superconducting electromagnet 740.

The satellite 700 may be used in a magnetic field that is artificial and/or natural. Optionally, the artificial magnetic field may be the magnetic field of a nearby satellite(s). The power source 715 may comprise at least one solar panel and/or on-board power supply e.g. a battery or a rechargeable battery. Alternatively, many other forms of a suitable power source(s) (e.g. a capacitor) may be used.

As mentioned above, the superconducting electromagnet 735 may be a High Temperature Superconductor (HTS) electromagnets 1100 which will be described later with reference to FIGS. 10A to 10F. The core(s) of the HTS electromagnet(s) 1100 may have a relative magnetic permeability greater than that of the conventional cores (e.g. iron cores). The core(s) 1100 may have a relative magnetic permeability greater than 5000.

A skilled person will appreciate that attitude control can be done with regular electromagnets. This is known in the industry as magnetorquer. However, using superconducting magnets such as HTS electromagnets are most preferred because such electromagnets will have zero electrical resistance at the superconducting state and therefore can conduct a much larger electric currents, creating an intense magnetic field and can be cheaper to operate in terms of energy consumption as compared to regular electromagnets.

Also, a skilled person will appreciate that the electromagnetic altitude control system may provide 6 degrees of freedom which can allow electromagnetic attitude control that requires three degrees of freedom.

As mentioned above, the present invention may use electromagnetic flux injection device 730 that may be configured to derive energy from the one power source 715 to energise the superconducting electromagnet 740 such as HTS electromagnet. As mentioned above, many other forms of a suitable power source(es) may be used. In one embodiment, the power source 715 may comprise both the solar panel and the on-board power supply.

The electromagnetic flux injection device 730 may be an electromagnetic flux pump such as a linear flux pump. Ohmic losses can occur at the welding points in which case the HTS coils may not be entirely resistance free. Therefore, a continuous energy input may be required to maintain a particular magnetic field strength. Such energy input cannot be feasibly and efficiently implemented with electric current leads (wires attached to a superconducting coil, which supply power) as they can cause further loses. At least for that reason, it is preferred that the electromagnetic injection device 730 is in the form of electromagnetic flux pump that is contactless.

A skilled person will appreciate how an electromagnetic flux injection device 730 or electromagnetic flux pump may be configured to derive energy from at least one power source to energise the superconducting electromagnet(s) such as HTS electromagnet(s), and therefore that need not be described in detail. The electromagnetic flux injection device 730 may be operatively coupled to the control device 725 and to the power source 715 and the electromagnetic flux injection device 730 may be controlled by the control device 725 (e.g. using a control signal from the control device 725). The electromagnetic flux injection device 730 may be configured to derive energy from said at least one power source to energise said at least one superconducting electromagnet (e.g. based on the control signal received from the control device).

A paper concerning a linear flux pump design which could be used to magnetize HTS tapes and coils is described in Fu, L., Matsuda, K., Baghdadi, M., & Coombs, T. (2015). Linear Flux Pump Device Applied to High Temperature Superconducting (HTS) Magnets. *IEEE Transactions on Applied Superconductivity*, 25(3), 1-4, which is incorporated by reference herein in its entirety. The design is based on an iron magnetic circuit together with copper solenoids and is powered by a current source driver circuit.

Figure 8:
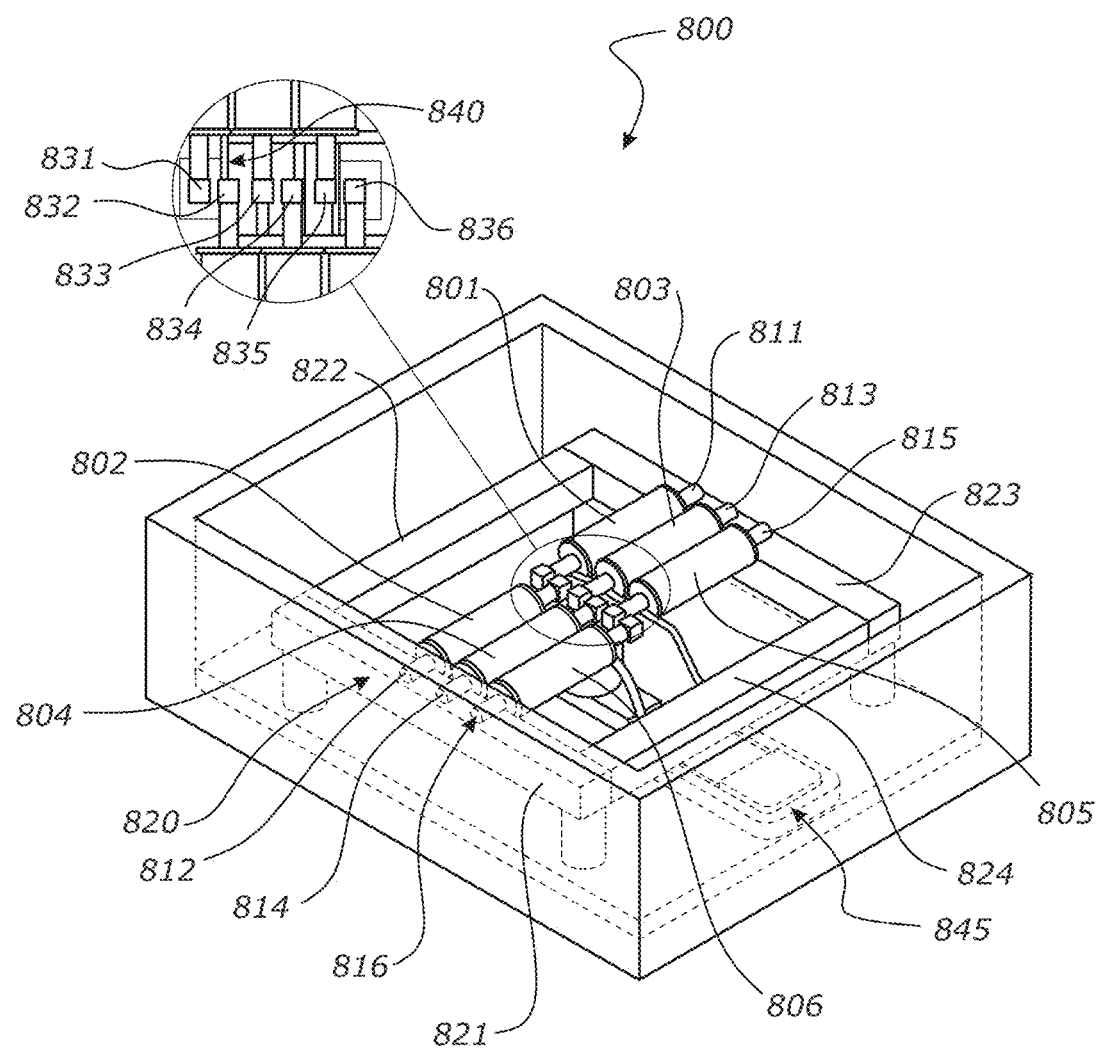
FIG. 8: shows an example of a linear flux pump suitable for use in the present invention.

FIG. 8 shows an example of linear flux pump 800 (similar to the one as described in that paper) that can be used to energize the superconducting electromagnet(s) 740 such as HTS electromagnet(s).

As shown in FIG. 8, the flux pump 800 may comprise a plurality of solenoids 801-806 that may be copper solenoids (or solenoids having copper coil) with an iron core 811-816. Of course, non-copper solenoids and non-iron cores may be used. Each of the iron cores 811-816 of the solenoids may extend between a first end portion and a second end portion. In this example, there are six solenoids 801-806 each with an iron core 811-816 that extends between a first end portion and a second end portion. The first end portion of each iron core may be attached to a common iron frame 820.

As shown in FIG. 8, the frame 820 may be square or substantially square in shape having a first side 821, a second side 822, a third side 823 and a fourth side 824. In this embodiment of the flux pump 800 comprising six solenoids 801-806, the first end portion of the iron core of each of three solenoids 802, 804, 806 may be attached to a first side 821 of the frame 820, and the first end portion of the iron core of each of the remaining three solenoids 801, 803, 805 may be attached to the third side 823 of the frame. The cubic pieces 831-836 are attached to the second end portions and the cubic pieces 831-836 are spaced apart from one another. As shown, the second portion of each of the iron cores 811-816 may be attached to one and independent cubic piece. In other words, as shown, the second portion of iron core 811 may be attached to cubic piece 831, second portion of iron core 812 may be attached to cubic piece 832, second portion of iron core 813 may be attached to cubic piece 833, second portion of iron core 814 may be attached to cubic piece 834, second portion of iron core 815 may be attached to cubic piece 835 and second portion of iron core 816 may be attached to cubic piece 836.

The flux pump 800 of FIG. 8 may be configured to magnetise the coil or coils of the superconducting electromagnet. This should be apparent to a person skilled in the art especially upon considering Fu, L., Matsuda, K., Baghdadi, M., & Coombs, T. (2015). *Linear Flux Pump Device Applied to High Temperature Superconducting (HTS) Magnets. IEEE Transactions on Applied Superconductivity*, 25(3), 1-4, which is incorporated by reference herein in its entirety.

Instead of the linear flux pump 800, a non-linear flux pump (e.g. non-linear flux pumps using permanent magnets instead of solenoids) may be used.

FIGS. 9A-9D show a lightweight chassis 900 of a satellite, according to one preferred embodiment of the present invention.

Figure 9A:
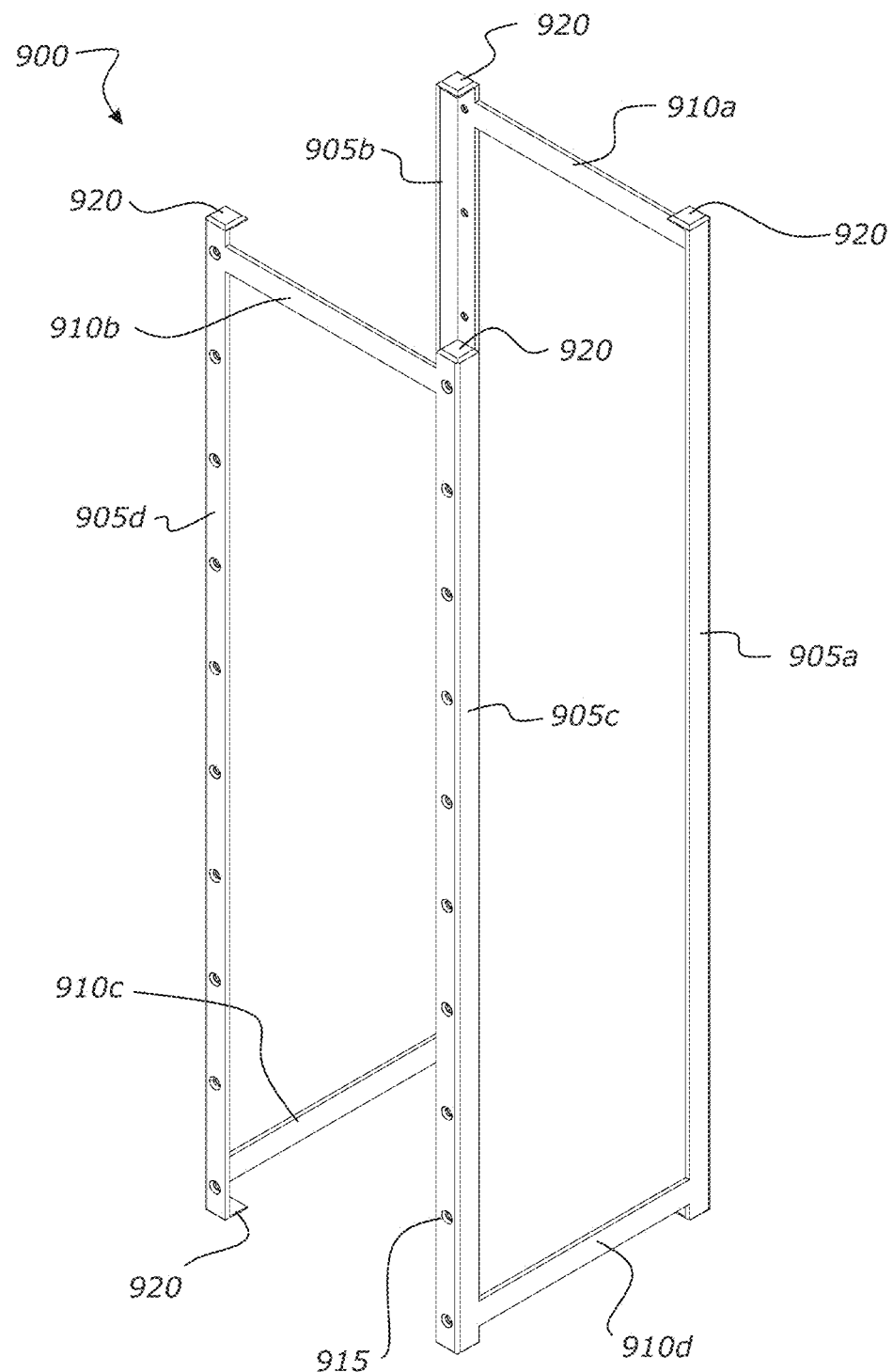
FIG. 9A: shows a front perspective view of a chassis according to one preferred embodiment of the present invention for use in a satellite.
Figure 9B:
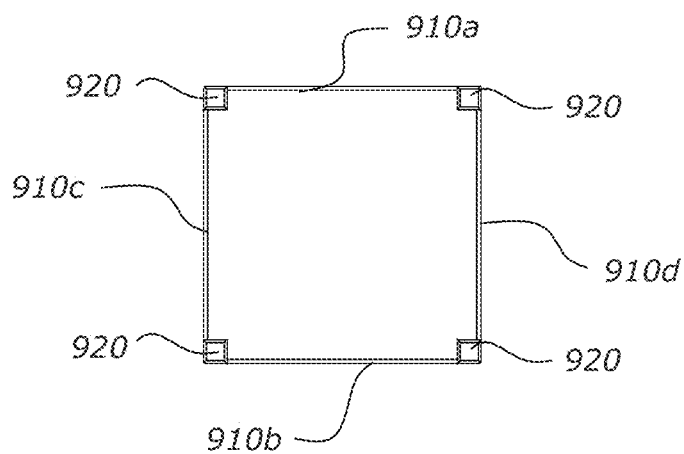
FIG. 9B: shows a top plan view of the chassis of FIG. 9A.
Figure 9C:
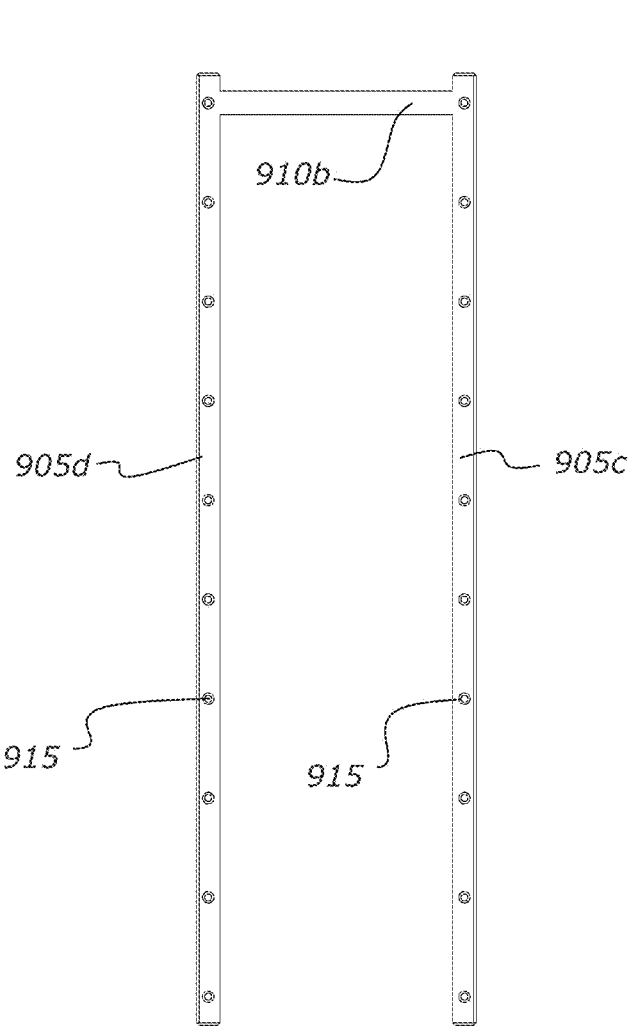
FIG. 9C: shows a rear side elevation view of the chassis of FIG. 9A.
Figure 9D:
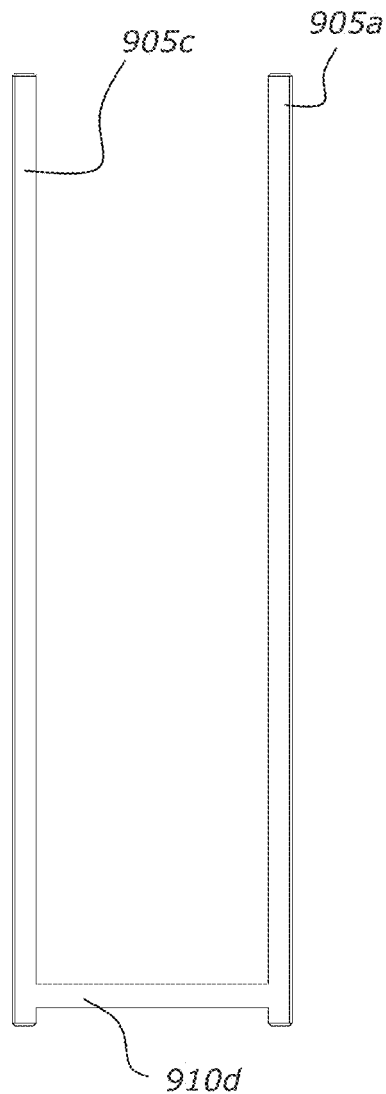
FIG. 9D: show a right-side elevation view of the chassis of FIG. 9A.

The chassis 900 may be in the form of a frame structure. The frame structure may be formed by four substantially vertical rails 905*a-d* that are spaced apart from each other and four substantially horizontal rails 910*a-d* that are spaced apart from each other. The chassis may be a four-sided polygonal shape (such as square or rectangular) in cross-section in a plane that is orthogonal to the longitudinal axis of each of the substantially vertical rails 905*a-d*. Each one of the four substantially vertical rails 905*a-d* may be connected to other two of the four substantially vertical rails via two substantially horizontal rails that substantially vertically spaced apart from one another and also are substantially orthogonal (i.e. substantially 90 degrees) to each other. For example, as shown in FIG. 9A, substantially vertical rail 905*a* is connected to two other substantially vertical rails 905*b* and 905*c* via two substantially horizontal rails 910*a* and 910*d* respectively. The substantially horizontal rails 910*a*, 910*d* are substantially vertically spaced apart from each other and also are substantially orthogonal (i.e. substantially 90 degrees) to each other. As shown, other substantially vertical rails 905*c*-905*d* are also each connected to two other substantially vertical rails via two substantially vertically spaced apart substantially horizontal rails in a similar manner.

As shown in FIGS. 9A-9D, the chassis 900 has minimal structural support allowing it to offer the space, which would otherwise be dedicated to structural satellite walls. By needing only 4 substantially vertical rails 905*a*-905*d* and substantially horizontal rails 910*a*-910*d*, the above-explained design of chassis 900 eliminates the need of chassis walls altogether. This is also apparent by comparing chassis 900 of FIGS. 9A-9D with the chassis of the satellites 300, 400, 500 shown in FIGS. 3-5. Therefore, with the above-explained design of the chassis 900, the overall mass of chassis satellite can be reduced.

The substantially vertical rails 905*a-d* and the substantially horizontal rails 910*a-d* may be integrally formed.

As shown, each substantially vertical rail 905*a-d* may comprise a first end portion and a second end portion and extend longitudinally between the first end portion and the second end portion and in each substantially vertical rail 905*a-d*, one of the substantially horizontal rails is located at or proximal to the first end portion and another one of the substantially horizontal rails is located at or proximal to the second end portion. For example, in substantially vertical rail 905*a* extending substantially vertically from a first end portion to a second end portion, two substantially horizontal rails 910*a* and 910*d* have been positioned such that one of the substantially horizontal rails is proximal to the first end portion and another one is proximal to the second end portion.

One or both of the first end portion and the second end portion of each substantially vertical rail 905*a-d* may comprise a cap or a plate member 920. The plate member 920 may be integrally formed with the substantially vertical rails 905*a-d*.

At least a portion of each substantially vertical rail 905*a-d* may be L-shaped in cross-section in a plane that is orthogonal to its longitudinal axis. The four substantially vertical rails 905*a-d* may be of the same length. At least one of the substantially vertical rails 905*a-d* may have a plurality of spaced apart apertures 915 along the length. The apertures 915 may be in the form of opening. These apertures 915 may facilitate mounting of components of the satellite on the chassis 900.

The four substantially horizontal rails 910*a-d* may also be of the same length.

The internal volume of the chassis 900 may be cuboid. The chassis may be constructed of a construction material that is rigid. The chassis 900 may be constructed of 3D-printed titanium or any other suitable alloy. 3D-printed titanium is preferable because it is stronger than the conventionally used aluminium, thus allowing to reduce the wall thickness and mass of the chassis 900. The 3D-printed titanium may be anodized for use in aluminium deployment sleeves to prevent cold welding. The chassis 900 may be adapted to be used to support a satellite as described above.

Components such as but not limited to electromagnets can be built into the walls of chassis 900. Such arrangement does not compromise the interior volume of the satellite, such as satellite 700. In other words, by mounting the components of the satellite into the walls, the interior space of the satellite is not occupied. A person skilled in the art will appreciate that such integration technique can provide significant advantage due to preservation of useful space/payload volume within the satellite.

To be in superconducting state, the superconducting electromagnet such as an HTS electromagnet will need to be cooled below its critical temperature, which is a temperature at which the HTS material changes from the normal resistive state and becomes a superconductor.

When used in a satellite environment, a superconducting electromagnet in which at least its component such as a coil can be cooled effectively without any need of moving components is desired because that would mean the less wear and tear, more reliability and low maintenance as compared to conventional cooling systems or methods. To achieve that, the electromagnet of the present invention is designed so that the electromagnet or at least the component thereof can be cooled by conduction cooling alone (i.e. solely by conduction cooling). It can be appreciated that conduction cooling also does not require any forced flow of fluid around the electromagnet, which means impurities and fluids will not enter the electromagnet and other electronic components of the satellite and therefore damage of the electromagnet and other electronic components of the satellite can be prevented. Conduction cooling is also desired for significant reduction in mass of the satellite and payload volume of the satellite as compared to conventional cooling methods. For example, conventional cooling methods such as using thermally insulated container constructed with an outer jacket containing liquid nitrogen (or helium) can add significant mass and payload volume to the satellite, however, conduction cooling will not require such containers or accessories and consequently significant reduction in mass and payload volume of the satellite can be achieved.

Turning now to FIGS. 10A-10F, an electromagnet 1100 according to one preferred embodiment of the present invention will now be described.

The electromagnet 1100 is a superconducting electromagnet, most preferably an HTS electromagnet suitable for use using the satellite 700 as described above with reference to FIG. 6.

As shown, the electromagnet 1100 comprises or is mounted to at least one cooling element. In this example, two cooling elements, namely a bottom cooling element 1110 and a top cooling element 1130 are shown. A coil 1120 may be in the form of a double pancake (circular) coil that is in thermal contact with the cooling elements 1110, 1130. In this example, the coil 1120 is shown as being sandwiched between the bottom cooling element 1110 and the top cooling element 1130. The cooling elements may be metallic elements such as but not limited to copper. Alternatively, the cooling elements may be non-metallic elements, such as but not limited to graphene, ceramic etc.

Figure 10A:
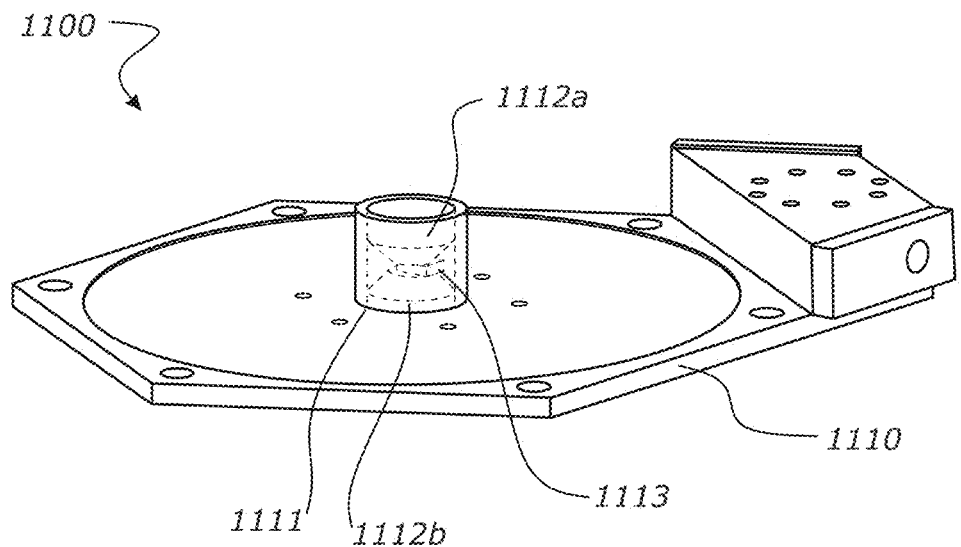
FIG. 10A: shows a bottom cooling element of an electromagnet according to one preferred embodiment of the present invention.

FIG. 10A shows the bottom cooling element 1110 of the electromagnet 1100 according to a preferred embodiment of the present invention. The bottom cooling element 1110 and/or the top cooling element 1130 may be of hexagonal shape and may be 2 mm in thickness. As shown, the bottom cooling element 1110 may comprise six 3 mm holes on 66 mm diameter.

A cylindrical magnet bore 1111, e.g. G10 cylindrical magnet bore may be provided as shown. The cylindrical magnet bore may have an outside diameter of about 10 mm and inside diameter of 8 mm.

Mild steel (magnetic) chamfered pole pieces 1112a, 1112b may be provided. A magnetic field sensor 1113 may be sandwiched between the two pole pieces 1112a, 1112b. Suitable support for the sensor and sensor leads may be provided.

A thermal link may be provided between the top and bottom cooling elements so that both the cooling elements 1110, 1130 are thermally coupled (i.e. is in thermal contact) to each other through the thermal link. One or more thermal straps, which may be metal thermal straps or non-metal may be used. For example, thermal straps made of carbon, graphite or graphene or any other suitable material may be used. A current bus bar may be thermally anchored but may be electrically isolated by use of sapphire plates and may be attached by nylon screws.

Figure 10B:
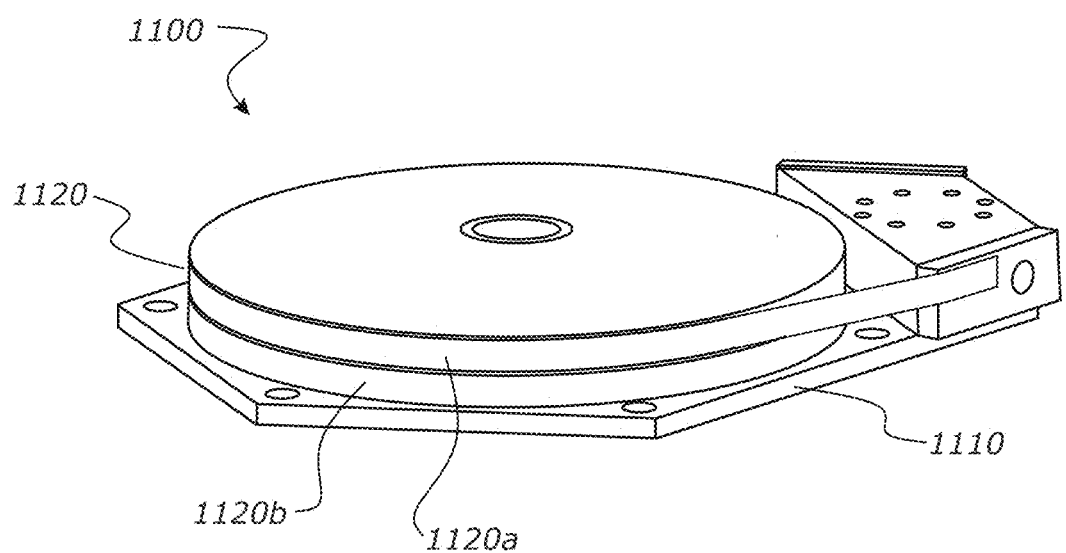
FIG. 10B: shows part of the electromagnet mentioned in FIG. 10A with a double pancake coil in place.

FIG. 10B shows part of the electromagnet 1100 with the coil in the form of a double pancake (circular) coil 1120 in place. The coil may be made from approximately 100 m long, 3 mm wide, 50 μm thick Superpower wire or 2G YBCO HTS tape/wire producing approximately 60 mm diameter coil. Insulation sheet, e.g. G10 insulation sheet may be provided between the two coils of the double pancake coil and cooling elements 1110, 1130. Coil windings may terminate on a current bus. Thermal grease may be used/applied in all thermal interfaces of electromagnet 1100. Use of thermal grease is advantageous as it allows improved heat coupling between components of the electromagnet 1100 to which such thermal grease is applied. The thermal grease may be Apeizon type N thermal grease. It should be noted that the coil need not be in a pancake or double pancake form. Many other suitable shapes of the coil such as but not limited to rectangular, triangular etc. may be used. Similarly, any number of coil or coils may be used, e.g. one coil, two coils or more.

Figure 10C:
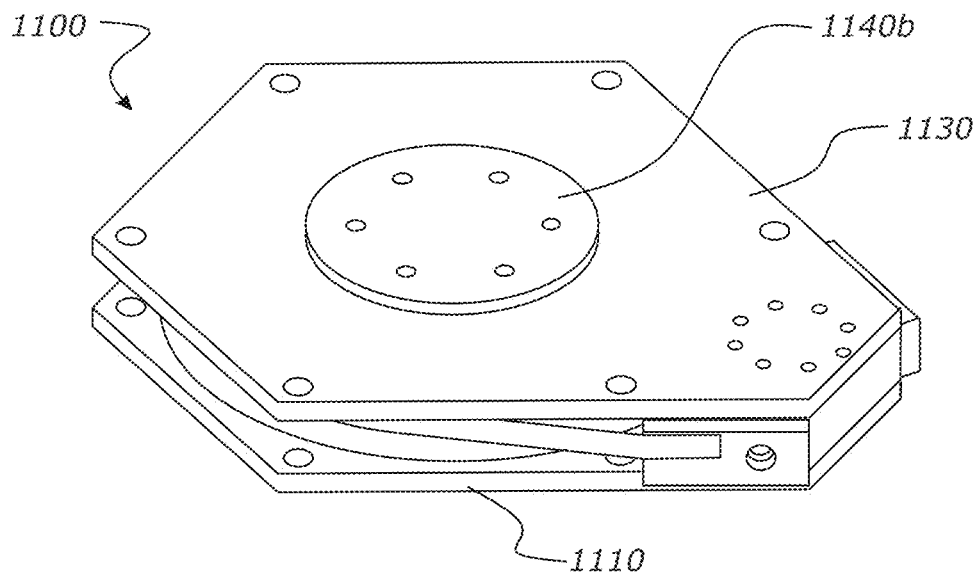
FIG. 10C: shows the electromagnet mentioned in FIGS. 10A and 10B with top and bottom cooling element in place.
Figure 10D:
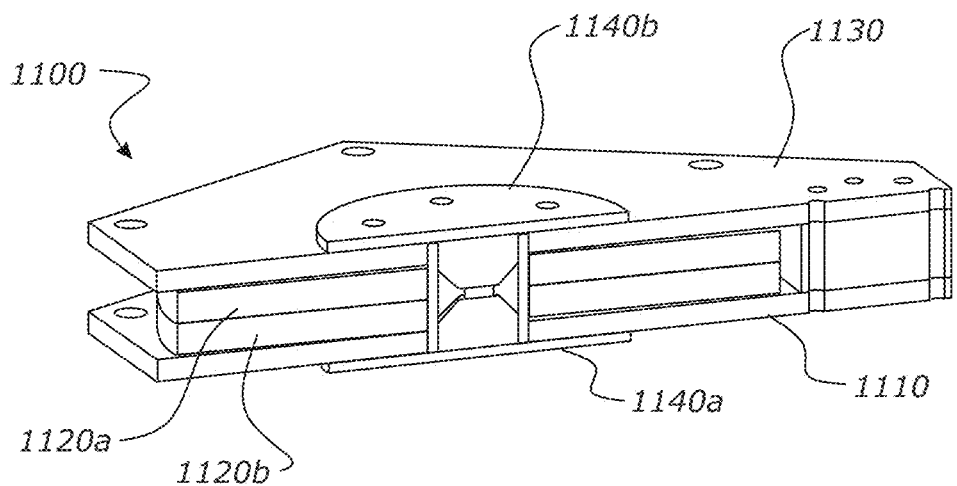
FIGS. 10D and E: show the cross-section of the electromagnet of FIG. 10C.
Figure 10E:
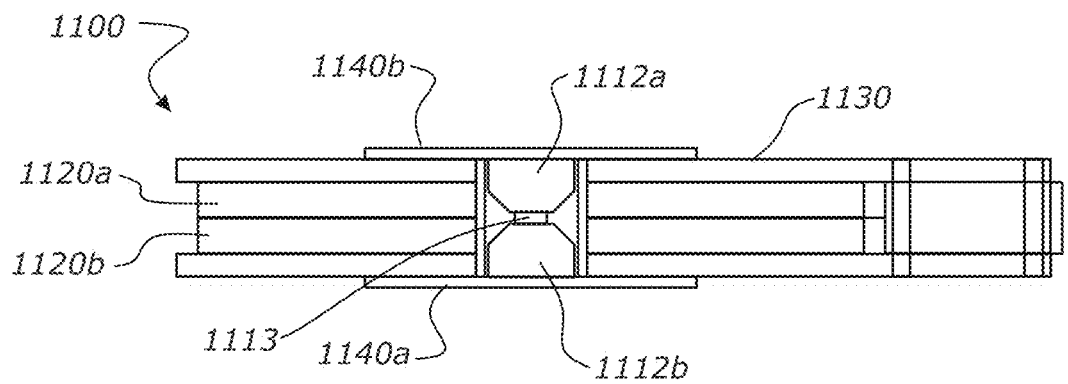
FIG. 10F: shows the electromagnet of FIG. 10C with securement means and cryocooler in place.

FIG. 10C shows 1100 with top cooling elements 1130 in place. As shown in the cross-sectional views of the electromagnet 1100 (see FIG. 10D and FIG. 10E), yoke plates 1140a 1140b such as mild steel (magnetic) yoke plates may optionally be placed in the exterior surface at least one of the top cooling elements 1130 and the bottom cooling element 1110. The yoke plates 1140a, 1140b may be screwed or lightly screwed to the cooling elements 1110, 1130. Having yoke plates 1140a, 1140b are advantageous because it assists in achieving the desired shape of the resultant magnetic field.

As shown in FIGS. 11F, a cryocooler 1150 is thermally coupled to the electromagnet 1100 for cooling. The cryocooler may be a micro-cryocooler. The cryocooler 1150 may be a Stirling cryocooler or pulse tube tactical cryocooler or a pulse tube miniature tactical cryocooler. Such cryocoolers provide a feasible cooling option in a satellite environment. Such cryocoolers have relatively small volume and power requirements. Further, using such cryocoolers means no working fluid/sleeve is required to cool the electromagnet. Pulse tube tactical cryocoolers have a further advantage of reduced vibration as compared to piston-based cryocoolers.

Figure 11:
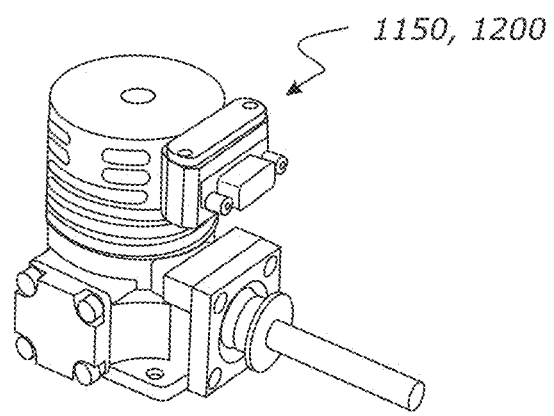
FIG. 11: shows one example of a cryocooler that may be used in the satellite or satellite system or with electromagnets according to the present invention.

FIG. 11 shows one example of a cryocooler 1200 that may be used in the present invention.

The cryocooler 1150 may be thermally coupled (i.e. is in thermal contact) to the cooling elements 1110, 1130.

In one embodiment, the cooling elements 1110, 1130 may be metal blocks.

Cooling elements 1110, 1130 may either be directly in thermal contact with the cryocooler 1150 or through other means such as cooling bus or a thermal strap. During use, the cryocooler 1150 will cool the cooling elements 1110, 1130 down to a temperature of at least approximately 80 Kelvin or lower. When the electromagnet 1100 or at least one or more components (e.g. the coil 1120) of the electromagnet 1100 are heated, the heated electromagnet and/or component(s) may then be cooled by the conduction through the cooling elements 1110, 1130. More specifically, when the cooling elements 1110, 1130 are cooled by the cryocooler 1150, the heat from the electromagnets and/or the component(s) may dissipate to the cooling elements 1110, 1130. Such cooling elements 1110, 1130 may then absorb the heat thereby causing the electromagnet 1100 or at least the heated components of the electromagnet 1100 to cool. The absorbed heat by the cooling elements may be dissipated to the ambient space via radiation panels or otherwise.

When the electromagnet 1100 is used with the satellite 700 as described above, preferably the cryocooler 1150 is operatively coupled to the control device 725. The cryocooler 1150 may be configured to derive energy from the power source 715 to cool the superconducting electromagnet 1100 or at least the component(s) of the electromagnet 1100. The control device 725 may also be configured to control the timing of the cryocooler 1150 to cool the at least one superconducting electromagnet 740. Such controlling of the cryocooler to cool the cooling elements 1110, 1130 using the control device 725 can also help prevent overheating of the cooling elements.

Figure 10F:
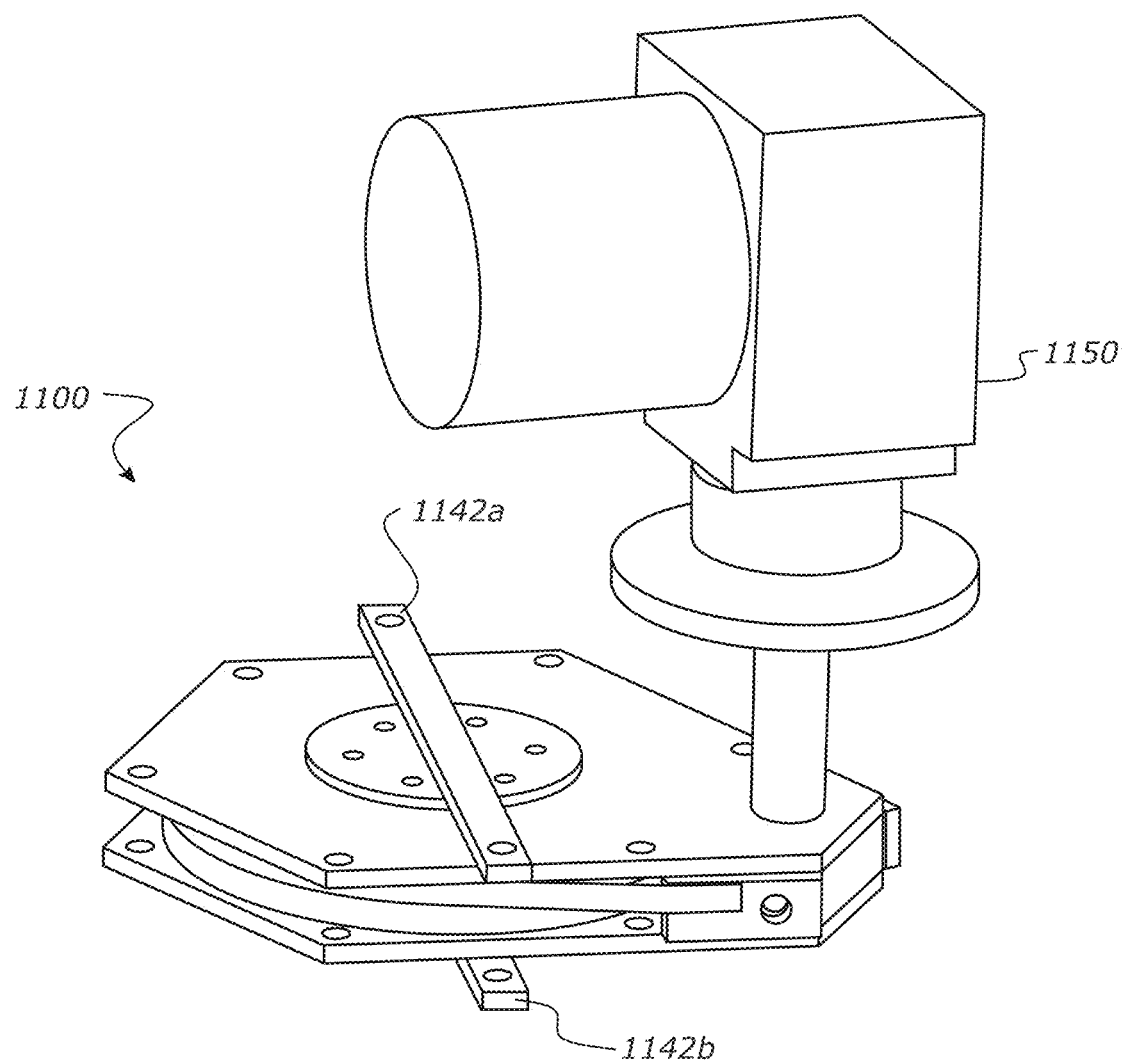

Using a thermal strap is advantageous as it provides a natural conduction path for cooling without adding structural loads to the satellite components. Thermal straps have lower mass, smaller in size and offer better conduction as compared to traditional thermal solutions. Some thermal straps also show increased conductivity at cryogenic temperatures and they are effective in dissipating heat from high-powered electronic components. Securement means may be provided to ensure that the cooling elements are clamped securely for thermal contact with the coil(s). As shown in FIG. 10F brackets 1142a, 1142b may be made from stainless steel may be used as securement means. The cryocooler is shown in FIG. 10F with reference numeral 1150.

In summary, the design of electromagnet 1100 according to the present invention may accommodate a 60 mm outer diameter double pancake coil 1120a, 1120b made from 3 mm HTS tape. Each coil 1120a, 1120b may use approximately 100 m of tape and may be dry-wound with no inter-turn insulation or may be embedded in a matrix with insulation. There may be an insulating sheet between the two coils 1120a, 1120b of the double pancake coil, and on the outer face of each pancake to reduce electrical shorting. The coils 1120a, 1120b may be sandwiched between two cooler elements 1110, 1130 that may be affixed to a cryocooler. The cooler elements 1110, 1130 are thermal conductors. The electromagnet or at least the components of the electromagnets such as the coils 1120a, 1120b may be cooled by conduction through the cooling elements.

The coils 1120a, 1120b may be wound on to an insulating mandrel or bore (preferably, G10 tube mandrel or G10 bore). A ferromagnetic core can optionally be placed within the bore to concentrate the magnetic field and increase the magnetic field density. Mild carbon steel or any other suitable material with a higher relative magnetic permeability and/or magnetic saturation point may be used.

Similarly, iron plates or mild steel plates 1140a, 1140b may be attached on the outside of the cooling elements 1110, 1130 to act as partial magnet yokes. The coil 1112a, 1112b would preferably be in two parts with a 1 mm gap so that a magnetic-field sensor 1113 and/or another suitable sensor(s) can be placed in the gap. The addition of materials with high relative magnetic permeability and high magnetic saturation threshold may significantly enhance the magnetic field that can be achieved in the centre of the magnet for a given set of coils 1120a 1120b.

To further summarise, the superconducting electromagnet 1100 of the present invention is suitable for use in a satellite 700. The satellite 700 can but need not be a small satellite. The electromagnet 1100 comprises or is mounted to a top cooling element 1130, a bottom cooling element 1110, and coil such as a double pancake coil 1120a, 1120b sandwiched between the top cooling element 1130 and the bottom cooling element 1110. The superconducting electromagnet 1100 or at least its component such as a coil is configured to be cooled by using conduction cooling.

A cryocooler 1150, 1200 may be coupled to the electromagnet 1100 for cooling. The cryocooler 1150, 1200 may be a micro-cryocooler. The cryocooler 1150, 1200 may be a Stirling cryocooler, a pulse tube tactical cryocooler, a pulse tube miniature tactical cryocooler. The cryocooler 1150 may be thermally coupled to the cooling elements which when cold (i.e. lower in temperature than the superconducting electromagnet 1100 or at least said one or more components of the electromagnet) allows transfer of thermal energy through them for cooling the superconducting electromagnet 1100 or at least said one or more components of the electromagnet 1100. More specifically, the cryocooler 1150 may be thermally coupled to the cooling elements 1110, 1130 for cooling the cooling elements 1110, 1130 so that when the cooling elements 1110, 1130 are at a lower temperature than the superconducting electromagnet 1100 or at least said one or more components thereof, a transfer of heat through the cooling elements 1110, 1130 causes conduction cooling of the electromagnet 1100 or at least or one or more components (such as a coil) of the electromagnets. Some non-limiting examples of the component(s) of electromagnets may include coil, yoke plate(s), bracket(s), cylindrical magnet bore, pole pieces etc.

At least one of the top and bottom cooling elements 1130, 1110 may be hexagonal or substantially hexagonal in shape. One or both of the top and bottom cooling elements 1130, 1110 may be made from copper, graphene, ceramic or any suitable metallic or non-metallic material.

At least one of the top and bottom cooling elements 1130, 1110 may be 2 mm in thickness. The bottom cooling element 1110 and/or top cooling element 1130 may comprise six holes, preferably, six 3 mm holes on 66 mm diameter.

The electromagnet 1100 may comprise a cylindrical magnet bore. The cylindrical magnet bore may have an outside diameter of about 10 mm and inside diameter of 8 mm. The electromagnet 1100 may comprise core formed as two pole pieces 1112a, 1112b with a magnetic field sensor 1113 sandwiched between the pole pieces 1112a, 1112b.

A thermal link may be provided between the top and bottom cooling elements 1130, 1110 to thermally couple the top and bottom cooling elements. In one embodiment, the coil 1120a, 1120b may be from approximately 100 m long, 3 mm wide, 50 μm thick Superpower wire or 2G YBCO HTS tape/wire. The coil 1120a, 1120b may have outer diameter of 60 mm or less (e.g. 56 mm).

The coil 1120a, 1120b may use approximately 100 m of tape and is preferably dry-wound with no inter-turn insulation or embedded in a matrix with insulation. The insulation sheet (preferably G10 insulation sheet) may be provided between the coil (or double pancake coil) and cooling elements 1110, 1130 to reduce odds of electrical shorting.

The inner diameter of the double pancake coils may be approximately 10 mm. The thickness of the double pancake coils is approximately 3 mm. The total number of turns of the wire or tape in the double pancake coil may be approximately 470. In one embodiment, the coil is wrapped around the cylindrical magnet bore.

For test setup, the windings of the coil 1120a, 1120b (coil windings) may terminate on a current bus.

The electromagnet 1100 may comprise at least one yoke plate 1140a, 1140b that may be attached to an exterior surface of one or both of the top or bottom cooling elements 1130, 1110.

Thermal grease may be used or applied to all thermal interfaces. The thermal grease may be Apeizon type N thermal grease. The yoke plate(s) 1140a, 1140b may be a mild steel (magnetic) yoke plate(s).

The yoke plate(s) 1140a, 1140b may be screwed or lightly screwed to the top and bottom cooling elements 1130, 1110.

A securement means may be provided to clamp the top and bottom cooling elements 1130, 1110 securely for thermal contact with the coil (or double pancake coil) 1120a, 1120b. The securement means may be one or more brackets 1142a, 1142b may be made out of stainless steel or any other suitable lighter material.

The electromagnet 1100 may be adapted to be energised by electromagnetic flux injection device. The electromagnetic flux injection device may an electromagnetic flux pump. The electromagnetic flux pump may be a linear flux pump. The electromagnetic flux pump may be contactless. The electromagnet 1100 may be adapted to be used with the satellites as described above.

In the above embodiment of the electromagnet 1100, two cooling elements 1110, 1130 are shown, although it is equally possible to use only one cooling element (e.g. only a bottom cooling element or only a top cooling element). However, having two cooling elements 1110, 1130 is most preferred as that allows cooling of the electromagnet or one or more components of the electromagnet 1100 from both top and bottom, and hence providing more efficient cooling of the electromagnet 1100 than only one cooling element. It may also be possible to use more than two cooling elements, e.g. on the sides of the coil. The number of cooling elements may depend upon the shape/geometry of the coil and/or requirements of cooling. In the above embodiments, the cooling elements 1110, 1130 are shown as cooling plates. However, cooling elements 1110, 1130 can be of any other suitable shape and size and need not necessarily be in the form of plates.

It can be appreciated that by using conduction cooling present invention eliminates any need for moving components for cooling which means high reliability, less wear and tear, and low maintenance as compared to conventional cooling systems or methods. Further, since conduction cooling does not require a forced flow of air or liquid, in impurities and liquids will not enter the electromagnet and other electronic components of the satellite which would otherwise damage the electromagnet and other electronic components of the satellite. Also, as explained above, by using conduction cooling, the present invention allows a significant reduction in mass and payload volume of the satellite as compared to other conventional cooling systems or methods.

Also, the present invention uses superconducting electromagnets which will have zero electrical resistance at the superconducting state and therefore can conduct a much larger electric currents, creating an intense magnetic field and can be cheaper to operate in terms of energy consumption.

Further, it can be appreciated that by using electromagnetic flux injection devices such as flux pumps to energise the electromagnet high current can be developed in the electromagnet or the coil without the need for high-current power supplies which can be bulky and expensive.

Although the forgoing describes several embodiments of the present invention with reference to satellites, the forgoing may equally apply to any other suitable spacecraft(s) which is/are not necessarily satellites, and which use(es) a magnetic field for position control.

It will of course be realised that while the foregoing has been given by way of illustrative example(s) of the present invention, all such modifications and variations thereto as would be apparent to a person skilled in the art are deemed to fall within the broad scope and ambit of the various aspects if invention as is hereinbefore described and/or defined in the claims.

The invention claimed is:

1. A satellite comprising:
a chassis; and
a superconducting magnet control system mounted to or within at least a portion of the chassis for position control of said satellite, said superconducting magnet control system comprising:
at least one superconducting electromagnet comprising at least one superconducting coil, and further comprising or mounted to at least one cooling plate that is in direct contact with said at least one superconducting coil;
at least one power source;
at least one control device;
at least one cryocooler; and
at least one electromagnetic flux injection device;
said at least one electromagnetic flux injection device being operatively connected to said at least one control device and being configured to derive energy from said at least one power source to energise said at least one superconducting electromagnet,
wherein said at least one cryocooler is thermally coupled to said at least one cooling plate to cool said at least one superconducting coil through said at least one cooling plate by conduction cooling alone.

2. The satellite as claimed in claim 1, wherein said at least one cryocooler is thermally coupled to said at least one cooling plate for cooling said at least one cooling plate so that when said at least one cooling plate is at a lower temperature than said at least one superconducting coil, a transfer of heat through said at least one cooling plate causes conduction cooling of at least said at least one superconducting coil.

3. The satellite as claimed in claim 1, wherein said cooling plate is a metallic cooling plate.

4. The satellite as claimed in claim 1, wherein said at least one superconducting electromagnet is a High Temperature Superconductor (HTS) electromagnet.

5. The satellite as claimed in claim 1, wherein said at least one superconducting electromagnet comprises or is mounted to at least two cooling plates that are in direct contact with said at least one superconducting coil, said cooling plates being a top cooling plate and a bottom cooling plate, wherein said at least one superconducting coil is sandwiched between said top cooling plate and said bottom cooling plate.

6. The satellite as claimed in claim 1, wherein said at least one cryocooler is operatively coupled to said at least one control device and to said at least one power source, wherein based on a control signal from said control device said at least one cryocooler is configured to derive energy from said at least one power source to cool at least said at least one superconducting coil.

7. The satellite as claimed in claim 1, further comprising a set of reaction wheels that is operatively coupled to said at least one power source and said at least one control device.

8. The satellite as claimed in claim 1, wherein said at least one control device derives energy from said at least one power source.

9. The satellite as claimed in claim 1, wherein said at least one control device is configured to control at least one of a timing, a magnitude and a polarity of magnetic field in said at least one superconducting electromagnet.

10. The satellite as claimed in claim 1, wherein said at least one control device is configured to control a timing of said at least one cryocooler to cool said at least one superconducting electromagnet.

11. The satellite as claimed in claim 1, wherein said at least one power source comprises at least one solar panel.

12. The satellite as claimed in claim 1, wherein said at least one power source is a battery or a capacitor.

13. The satellite as claimed in claim 1, wherein said at least one electromagnetic flux injection device is controlled by said at least one control device to derive energy from said at least one power source to energise said at least one superconducting electromagnet.

14. The satellite as claimed in claim 1, wherein said at least one electromagnetic flux injection device is an electromagnetic flux pump.

15. The satellite as claimed in claim 14, wherein said at least one electromagnetic flux pump is a linear flux pump.

16. The satellite as claimed in claim 14, wherein said at least one electromagnetic flux pump is contactless.

17. The satellite as claimed in claim 16, wherein said at least one electromagnetic flux pump is a non-linear flux pump.

18. The satellite as claimed in claim 14, wherein said at least one electromagnetic flux pump is configured to magnetise said at least one superconducting coil, said at least one superconducting coil being a HTS coil comprising HTS tape.

19. The satellite as claimed in claim 1, wherein said satellite has a mass of 500 kg or less.

20. A superconducting magnet control system for a satellite for position control of said satellite, said superconducting magnet control system comprising:
at least one superconducting electromagnet comprising at least one superconducting coil, and further comprising or mounted to at least one cooling plate that is in direct contact with said at least one superconducting coil; and
at least one cryocooler;

wherein said at least one cryocooler is thermally coupled to said at least one cooling plate to cool said at least one superconducting coil through said at least one cooling plate by conduction cooling alone.

21. A method of cooling a superconducting electromagnet for use in a satellite, the method comprising the steps of:
providing a satellite comprising a superconducting magnet control system for position control of said satellite, said superconducting magnet control system having at least one superconducting electromagnet comprising at least one superconducting coil and further comprising or mounted to at least one cooling plate that is in direct contact with said at least one coil; and
thermally coupling at least one cryocooler to said at least one cooling plate to cool said at least one superconducting coil through said at least one cooling pate by conduction cooling alone.

22. A spacecraft comprising:
a chassis; and
a superconducting magnet control system mounted to or within at least a portion of said chassis for position control of said spacecraft, said superconducting magnet control system comprising:
at least one superconducting electromagnet comprising at least one superconducting coil, and further comprising or mounted to at least one cooling plate that is in direct contact with said at least one superconducting coil; and
at least one cryocooler;
wherein said at least one cryocooler is thermally coupled to said at least one cooling plate to cool said at least one superconducting coil through said at least one cooling plate by conduction cooling alone.

23. A superconducting magnet control system for a spacecraft for position control of said spacecraft, said superconducting magnet control system comprising:
at least one superconducting electromagnet comprising at least one superconducting coil, and further comprising or mounted to at least one cooling plate that is in direct contact with said at least one superconducting coil; and
at least one cryocooler;
wherein said at least one cryocooler is thermally coupled to said at least one cooling plate to cool said at least one superconducting coil through said at least one cooling plate by conduction cooling alone.

* * * * *